United States Patent
Wang et al.

(10) Patent No.: US 11,996,091 B2
(45) Date of Patent: May 28, 2024

(54) MIXED SPEECH RECOGNITION METHOD AND APPARATUS, AND COMPUTER-READABLE STORAGE MEDIUM

(71) Applicant: TENCENT TECHNOLOGY (SHENZHEN) COMPANY LIMITED, Shenzhen (CN)

(72) Inventors: Jun Wang, Shenzhen (CN); Jie Chen, Shenzhen (CN); Dan Su, Shenzhen (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 183 days.

(21) Appl. No.: 16/989,844

(22) Filed: Aug. 10, 2020

(65) Prior Publication Data
US 2020/0372905 A1 Nov. 26, 2020

Related U.S. Application Data

(63) Continuation of application No. PCT/CN2019/082978, filed on Apr. 17, 2019.

(30) Foreign Application Priority Data

May 24, 2018 (CN) .......................... 201810507294.5

(51) Int. Cl.
*G10L 15/20* (2006.01)
*G10L 15/02* (2006.01)
(Continued)

(52) U.S. Cl.
CPC .............. *G10L 15/20* (2013.01); *G10L 15/02* (2013.01); *G10L 15/16* (2013.01); *G10L 15/22* (2013.01);
(Continued)

(58) Field of Classification Search
CPC ......... G10L 15/20; G10L 17/06; G10L 15/02; G10L 15/16; G10L 15/22; G10L 21/02;
(Continued)

(56) References Cited

U.S. PATENT DOCUMENTS 8,392,185 B2 * 3/2013 Nakadai .............. G10L 21/0272
704/235
9,818,431 B2 * 11/2017 Yu ........................... G10L 25/30
(Continued)

FOREIGN PATENT DOCUMENTS

| CN | 1737906 A | 2/2006 |
|---|---|---|
| CN | 102142259 A | 8/2011 |

(Continued)

OTHER PUBLICATIONS

King, Brian, I-Fan Chen, Yonatan Vaizman, Yuzong Liu, Roland Maas, Sree Hari Krishnan Parthasarathi and Björn Hoffmeister, "Robust Speech Recognition via Anchor Word Representations", 2017, Interspeech 2017, pp. 2471-2475. (Year: 2017).*

(Continued)

*Primary Examiner* — Richa Sonifrank
*Assistant Examiner* — James Boggs
(74) *Attorney, Agent, or Firm* — ANOVA LAW GROUP, PLLC

(57) ABSTRACT

A mixed speech recognition method, a mixed speech recognition apparatus, and a computer-readable storage medium are provided. The mixed speech recognition method includes: monitoring an input of speech input and detecting an enrollment speech and a mixed speech; acquiring speech features of a target speaker based on the enrollment speech; and determining speech belonging to the target speaker in the mixed speech based on the speech features of the target speaker. The enrollment speech includes preset
(Continued)

speech information, and the mixed speech is non-enrollment speech inputted after the enrollment speech.

17 Claims, 8 Drawing Sheets

(51) Int. Cl.
|  |  |
|---|---|
| *G10L 15/16* | (2006.01) |
| *G10L 15/22* | (2006.01) |
| *G10L 17/06* | (2013.01) |
| *G10L 21/02* | (2013.01) |
| *G10L 21/0272* | (2013.01) |
| G10L 21/0208 | (2013.01) |

(52) U.S. Cl.
CPC .............. *G10L 17/06* (2013.01); *G10L 21/02* (2013.01); *G10L 21/0272* (2013.01); *G10L 2015/223* (2013.01); *G10L 2021/02087* (2013.01)

(58) Field of Classification Search
CPC ........... G10L 21/0272; G10L 2015/223; G10L 2021/02087
See application file for complete search history.

(56) References Cited

U.S. PATENT DOCUMENTS

| | | | | |
|---|---|---|---|---|
| 9,881,634 | B1* | 1/2018 | Corey | G10L 15/02 |
| 10,192,553 | B1* | 1/2019 | Chenier | H04L 65/4015 |
| 10,366,687 | B2* | 7/2019 | Zhan | G10L 15/14 |
| 10,373,612 | B2* | 8/2019 | Parthasarathi | G10L 15/08 |
| 10,529,349 | B2* | 1/2020 | Le Roux | G10L 19/06 |
| 10,741,195 | B2* | 8/2020 | Furuta | G10L 25/30 |
| 2004/0066941 | A1 | 4/2004 | Amada et al. | |
| 2006/0031066 | A1 | 2/2006 | Hetherington et al. | |
| 2011/0182437 | A1 | 7/2011 | Kim et al. | |
| 2011/0224980 | A1 | 9/2011 | Nakadai et al. | |
| 2013/0282373 | A1* | 10/2013 | Visser | G10L 21/0208 704/231 |
| 2014/0355776 | A1 | 12/2014 | Park et al. | |
| 2015/0112682 | A1* | 4/2015 | Rodriguez | G10L 17/26 704/249 |
| 2015/0149165 | A1 | 5/2015 | Saon | |
| 2016/0189730 | A1 | 6/2016 | Du et al. | |
| 2017/0092268 | A1 | 3/2017 | Kristjansson | |
| 2017/0154640 | A1 | 6/2017 | Wang | |
| 2017/0270919 | A1 | 9/2017 | Parthasarathi et al. | |
| 2018/0190280 | A1 | 7/2018 | Cui et al. | |
| 2018/0261225 | A1* | 9/2018 | Watanabe | G10L 15/16 |
| 2019/0156846 | A1 | 5/2019 | Kida et al. | |
| 2019/0214011 | A1 | 7/2019 | Shin et al. | |
| 2020/0098375 | A1* | 3/2020 | Bisio | G10L 17/02 |
| 2020/0342890 | A1 | 10/2020 | Ma et al. | |

FOREIGN PATENT DOCUMENTS

| | | |
|---|---|---|
| CN | 104049721 A | 9/2014 |
| CN | 105280183 A | 1/2016 |
| CN | 105895078 A | 8/2016 |
| CN | 105989836 A | 10/2016 |
| CN | 106782504 A | 5/2017 |
| CN | 107239825 A | 10/2017 |
| CN | 107785029 A | 3/2018 |
| CN | 107886943 A | 4/2018 |
| CN | 108962237 A | 12/2018 |
| CN | 109155132 A | 1/2019 |
| JP | 2004109361 A | 4/2004 |
| JP | 2017116876 A | 6/2017 |
| JP | 2019514045 A | 5/2019 |
| JP | 2019095551 A | 6/2019 |
| WO | 2015160586 A1 | 10/2015 |
| WO | 2017112466 A1 | 6/2017 |
| WO | 2017218492 A1 | 12/2017 |
| WO | 2018070639 A1 | 4/2018 |

OTHER PUBLICATIONS

Hershey, John R., Zhuo Chen, Jonathan Le Roux, Shinji Watanabe, "Deep Clustering: Discriminative Embeddings for Segmentation and Separation", 2016, 2016 IEEE International Conference on Acoustics, Speech and Signal Processing (ICASSP), pp. 31-35. (Year: 2016).*
Variani, Ehsan, Xin Lei, Erik McDermott, Ignacio Lopez Moreno, and Javier Gonzalez-Dominguez, "Deep Neural Networks for Small Footprint Text-Dependent Speaker Verification", 2014, 2014 IEEE International Conference on Acoustics, Speech and Signal Processing (ICASSP), pp. 4080-4084. (Year: 2014).*
Chen, Zhuo, Yi Luo, and Nima Mesgarani, "Deep Attractor Network for Single-microphone Speaker Separation", Mar. 2017, 2017 IEEE International Conference on Acoustics, Speech and Signal Processing (ICASSP), pp. 246-250. (Year: 2017).*
Du, Jun, Yanhui Tu, Yong Xu, Lirong Dai, and Chin-Hui Lee, "Speech Separation of a Target Speaker Based on Deep Neural Networks", Oct. 2014, 2014 12th International Conference on Signal Processing (ICSP), pp. 473-477. (Year: 2014).*
Tu, Yanhui, Jun Du, Yong Xu, Lirong Dai, and Chin-Hui Lee, "Speech Separation Based on Improved Deep Neural Networks with Dual Outputs of Speech Features for Both Target and Interfering Speakers", May 2014, 2014 9th International Symposium on Chinese Spoken Language Processing (ISCSLP), pp. 250-254. (Year: 2014).*
Park, Sunho, Jiho Yoo, and Seungjin Choi, "Target Speech Extraction with Learned Spectral Bases", Apr. 2009, 2009 IEEE International Conference on Acoustics, Speech and Signal Processing (ICASSP), pp. 1789-1792. (Year: 2009).*
Wang, Jun, Jie Chen, Dan Su, Lianwu Chen, Meng Yu, Yanmin Qian, and Dong Yu, "Deep Extractor Network for Target Speaker Recovery from Single Channel Speech Mixtures", Sep. 2018, Interspeech 2018, pp. 307-311. (Year: 2018).*
The World Intellectual Property Organization (WIPO) International Search Report for PCT/CN2019/082978 dated Jul. 18, 2019 5 Pages (including translation).
The State Intellectual Property Office of the People's Republic of China (SIPO) Office Action 1 for 201810507294.5 dated Apr. 14, 2020 12 Pages (including translation).
Zhuo Chen et al., "Deep Attractor Network for Single-Microphone Speaker Separation," 2017 EEE International Conference on Acoustics, Speech and Signal Processing, Dec. 31, 2017 (Dec. 31, 2017), pp. 246-250. 5 Pages.
Yi Luo et al., "Speaker-Independent Speech Separation With Deep Attractor Network", "IEEE/ACM Transactions on Audio, Speech, and Language Processing," vol. 26, No. 4, Apr. 30, 2018 (Apr. 30, 2018), pp. 787-796. 10 Pages.
G. E. Dahl et al., "Context-dependent pre-trained deep neural networks for large-vocabulary speech recognition," IEEE Transactions on Audio, Speech and Language Processing, vol. 20, No. 1, pp. 30-42, 2012. 13 Pages.
F. Seide et al., "Conversational speech transcription using context-dependent deep neural network," InterSpeech'11, pp. 437-440, 2011. 4 Pages.
Dong Yu et al., "Permutation invariant training of deep models for speaker-independent multi-talker speech separation," ICASSP'17, pp. 31-35, 2017. 5 Pages.
Z. Chen et al., "Progressive joint modeling in unsupervised single-channel overlapped speech recognition," IEEE/ACM Transactions on Audio, Speech, and Language Processing, vol. 26, No. 1, J pp. 184-196, Jan. 2018 13 Pages.
M. Kolbæk et al., "Joint separation and denoising of noisy multi-talker speech using recurrent neural networks and permutation invariant training," MLSP'17, 2017. 6 Pages.
Y. Qian et al., "Single-channel multi-talker speech recognition with permutation invariant training," arxiv, 2017. 11 Pages.

(56) References Cited

OTHER PUBLICATIONS

J. R. Hershey et al., "Deep clustering: Discriminative embeddings for segmentation and separation," ICASSP'16, pp. 31-35, 2016. 5 Pages.

Z. Chen et al., "Deep attractor network for single-microphone speaker separation," ICASSP'17, 2017. 5 Pages.

K. Zmolikova et al., "Speaker-aware neural network based beamformer for speaker extraction in speech mixtures," Interspeech'17, 2017. 5 Pages.

M. Delcroix et al., "Context adaptive deep neural networks for fast acoustic model adaptation in noisy conditions," ICASSP'16, p. 5270-5274, 2016. 5 Pages.

D. Wang et al., "Supervised speech separation based deep learning: An Overview," arxiv, 2017. 27 Pages.

K. Zmolikova et al., "Learning speaker representation for neural network based multichannel speaker extractions," ASRU'17, Dec. 2017. 3 Pages.

B. King, et al., "Robust speech recognition via anchor word representations." InterSpeech 2017 5 Pages.

The European Patent Office (EPO) Office Action 1 for for 19806534.4 dated Jun. 18, 2021 7 Pages (including translation).

The Japan Patent Office (JPO) Notification of Reasons for Refusal for Application No. 2020-547178 and Translation dated Nov. 9, 2021 13 pages (including translation).

The State Intellectual Property Office of the People's Republic of China (SIPO) Office Action 1 for for 201910745788.1 dated Oct. 9, 2021 12 pages (including translation).

Zhuo Chen et al., "Cracking the cocktail party problem by multi-beam deep attractor network," 2017 IEEE Automatic Speech Recognition and Understanding Workshop, Feb. 28, 2018 (Feb. 28, 2018). 8 pages.

\* cited by examiner

MIXED SPEECH RECOGNITION METHOD AND APPARATUS, AND COMPUTER-READABLE STORAGE MEDIUM

CROSS REFERENCES TO RELATED APPLICATIONS

This application is a continuation application of PCT Patent Application No. PCT/CN2019/082978, filed on Apr. 17, 2019, which claims the priority to Chinese patent application No. 201810507294.5, filed with the National Intellectual Property Administration, PRC on May 24, 2018 and entitled "MIXED SPEECH RECOGNITION METHOD AND APPARATUS, AND COMPUTER-READABLE STORAGE MEDIUM", the entire contents of both of which are incorporated herein by reference.

FIELD OF THE TECHNOLOGY

The present disclosure belongs to the field of speech recognition technologies, and in particular, to a mixed speech recognition method, a mixed speech recognition apparatus, and a computer-readable storage medium.

BACKGROUND OF THE DISCLOSURE

As an acoustic representation of language, speech is one of the most natural, effective and convenient means for humans to exchange information. In recent years, computer speech recognition technologies have made tremendous progress. However, when speech is input into a computer for speech recognition, the input speech is inevitably interfered by environmental noise, room reverberation and even speech of other speakers. The interferences ultimately make the speech acquired by the computer not pure, but the speech contaminated by noise (that is, mixed speech). In recent years, many deep learning-based methods and systems have been developed to process separation and recognition of a mixed speech signal. However, most systems need to recognize all speakers in a mixed speech before making further processing.

SUMMARY

Embodiments of the present disclosure provide a mixed speech recognition method, a mixed speech recognition apparatus and a computer-readable storage medium, so that speech of a target speaker may be determined in mixed speech and tracking the speech of the target speaker in the mixed speech is facilitated.

A first aspect of the embodiments of the present disclosure provides a mixed speech recognition method, including: monitoring an input of speech input and detecting an enrollment speech and a mixed speech; acquiring speech features of a target speaker based on the enrollment speech; and determining speech belonging to the target speaker in the mixed speech based on the speech features of the target speaker. The enrollment speech includes preset speech information, and the mixed speech is non-enrollment speech inputted after the enrollment speech.

A second aspect of the embodiments of the present disclosure provides a mixed speech recognition apparatus, including: a memory and a processor coupled to the memory. The processor is configured to perform: monitoring an input of speech input and detecting an enrollment speech and a mixed speech; acquiring speech features of a target speaker based on the enrollment speech; and determining speech belonging to the target speaker in the mixed speech based on the speech features of the target speaker. The enrollment speech includes preset speech information, and the mixed speech is non-enrollment speech inputted after the enrollment speech.

A third aspect of the embodiments of the present disclosure provides a non-transitory computer-readable storage medium, storing a computer program. When executed by a processor, the computer program implements: monitoring an input of speech input and detecting an enrollment speech and a mixed speech; acquiring speech features of a target speaker based on the enrollment speech; and determining speech belonging to the target speaker in the mixed speech based on the speech features of the target speaker. The enrollment speech includes preset speech information, and the mixed speech is non-enrollment speech inputted after the enrollment speech.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings required for describing the embodiments or the related art. Apparently, the accompanying drawings in the following description show only some embodiments of the present disclosure, and a person of ordinary skill in the art may still derive other drawings according to the accompanying drawings without creative efforts.

DESCRIPTION OF EMBODIMENTS

In the following description, for the purpose of illustration rather than limitation, specific details such as the specific system structure and technology are provided to thoroughly understand the embodiments of the present disclosure. However, a person skilled in the art knows that the present disclosure may be implemented in other embodiments without these specific details. In other cases, detailed descriptions of well-known systems, apparatuses, circuits, and methods are omitted to avoid unnecessary details hindering the description of the present disclosure.

It is to be understood that the order of the sequence numbers of the steps in the following method embodiments does not mean the order of execution, and the execution order of each process is determined by its function and inherent logic, and does not constitute any limitation on the implementation process of each embodiment.

To describe technical solutions in the present disclosure, the following will be described by using specific embodiments.

Figure 1:
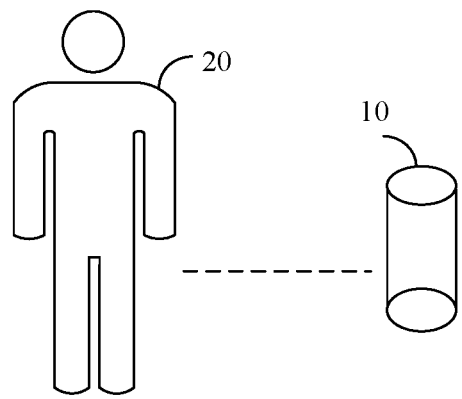
FIG. 1 is a schematic diagram of an application scenario according to an embodiment of the present disclosure.

FIG. 1 is a schematic diagram of an application scenario according to an embodiment of the present disclosure. As shown in FIG. 1, a user 20 may perform speech interaction with a computer device 10. The computer device 10 may include a microphone or a microphone array. The computer device may be various terminal devices, such as a smart speaker, a smart television, a smart speech assistant, a mobile phone, a tablet computer, an e-book reader, smart glasses, a smart watch, a laptop computer and a desktop computer.

Figure 2:
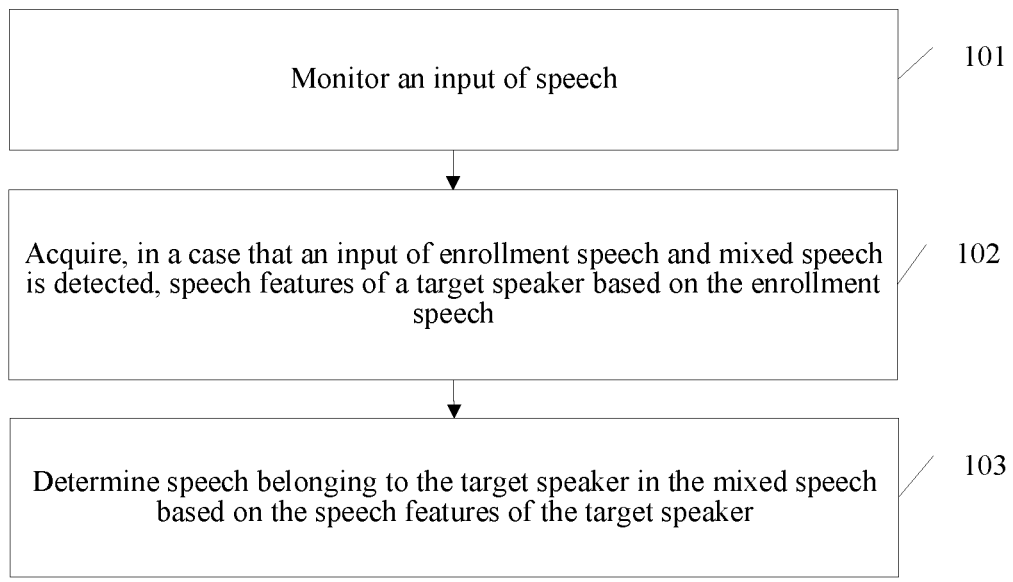
FIG. 2 is a schematic structural flowchart of a mixed speech recognition method according to an embodiment of the present disclosure.

An embodiment of the present disclosure provides a mixed speech recognition method. Referring to FIG. 2, the mixed speech recognition method in some embodiments of the present disclosure includes the following steps:

Step 101. Monitor an input of speech.

In some embodiments of the present disclosure, the input of the speech may be monitored by using the microphone array to reduce noise interferences of the speech input. The microphone or the microphone array may be connected to a computer device in a wired or wireless manner, or embedded in the computer device. After the microphone array detects the speech input, the speech is transmitted to the computer device. The computer device may be various terminal devices, or may be a server.

Step 102. Acquire, in a case that enrollment speech and mixed speech are detected in the input speech, speech features of a target speaker based on the enrollment speech.

In some embodiments of the present disclosure, the enrollment speech is speech including preset speech information. In a case that the computer device detects a speech input including the preset speech information in the input speech, the input of the enrollment speech may be considered to be detected. For example, in the application scenario of a smart speaker, wake-up speech usually needs to be inputted to wake up a speech control function of the smart speaker and the wake-up speech is speech that includes a wake-up word (for example, "Dingdong Dingdong"). Therefore, the wake-up speech may be used as the enrollment speech in the application scenario. In a case that the smart speaker detects the input of the wake-up speech, the input of the enrollment speech may be considered to be detected. The wake-up word may be preset.

According to some embodiments of the present disclosure, in step 102, the speech features of the target speaker may be extracted from the enrollment speech based on a speech feature recognition algorithm (for example, the Mel-frequency cepstral coefficients (MFCC) algorithm).

Certainly, in step 102, the speech features of the target speaker may alternatively be extracted from the enrollment speech through other manners. Reference may be made to descriptions in subsequent embodiments for details.

Step 103. Determine speech belonging to the target speaker in the mixed speech based on the speech features of the target speaker.

The mixed speech is non-enrollment speech that is detected and inputted to the computer device by the microphone array after the enrollment speech.

In step 103, the computer device may recognize speech features similar to the speech features of the target speaker from the mixed speech by a similarity likelihood algorithm based on the speech features of the target speaker, thereby determining the speech belonging to the target speaker in the mixed speech.

It can be learned from the above that, in some embodiments of the present disclosure, the speech features of the target speaker are acquired based on the enrollment speech in a case that the input of the enrollment speech and the mixed speech is detected; and the speech belonging to the target speaker in the mixed speech is determined based on the speech features of the target speaker. By introducing speech features of a target speaker learned by enrollment speech, according to the method of some embodiments of the present disclosure, the speech of the target speaker may be determined in the mixed speech, to facilitate tracking the speech of the target speaker in the mixed speech. Even in a case where an interference speaker and the target speaker are relatively close to each other in the application scenario, the speech of the target speaker may still be accurately recovered, and the accuracy of an interfered speech command recognition in subsequent processing may be improved. For example, in the application scenario of a smart speaker, wake-up speech may be used as a feature of a speaker of the wake-up speech (that is, the target speaker) learned by the enrollment speech, and speech belonging to the speaker of the wake-up speech is recognized and tracked in the mixed speech that is inputted after the wake-up speech. In addition, because the speech features of the target speaker in some embodiments of the present disclosure do not depend on the number of speakers in the mixed speech, in some embodiments of the present disclosure, the number of speakers in the mixed speech does not need to be learned in advance or estimated during the mixed speech recognition process.

Figure 3:
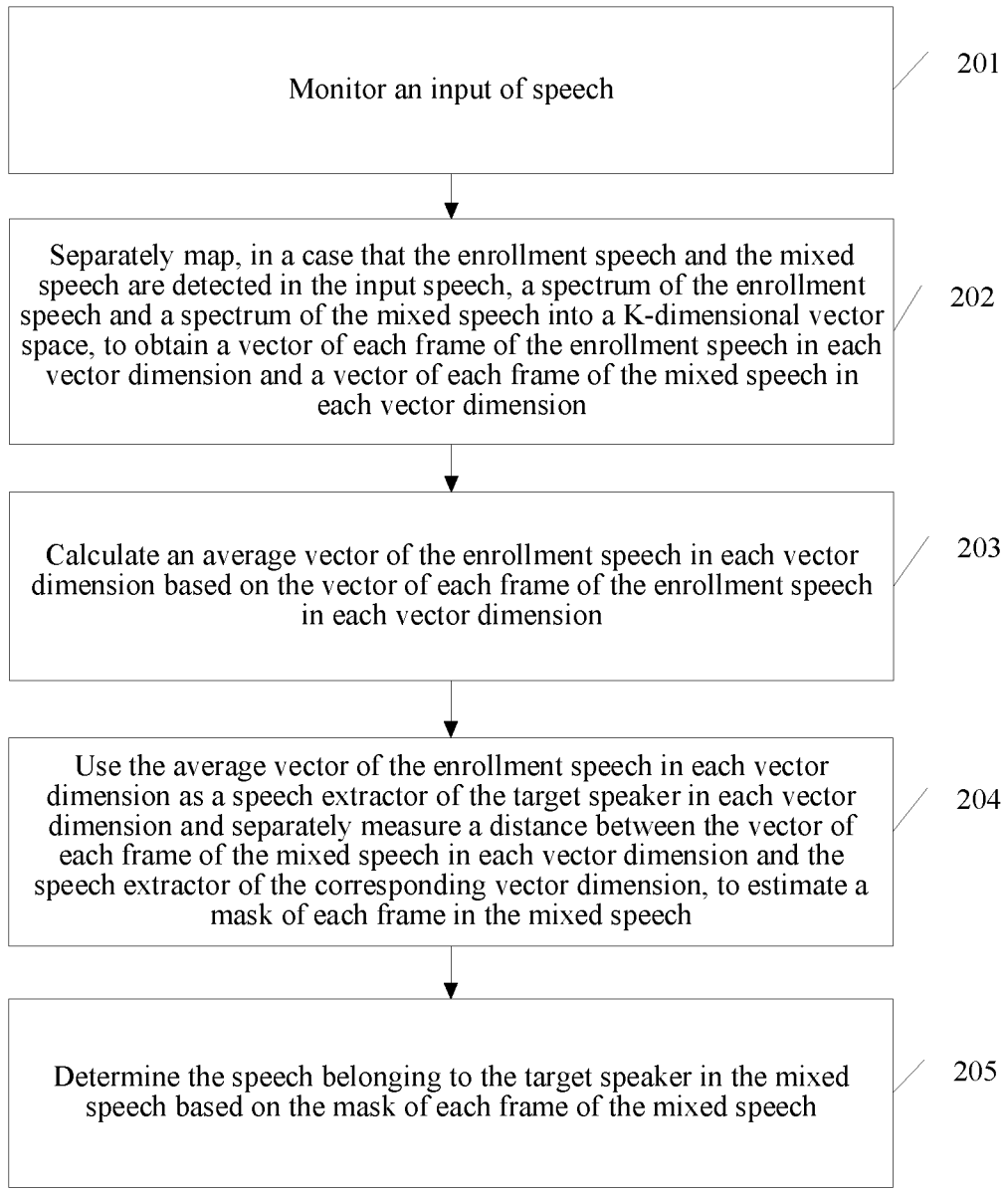
FIG. 3 is another schematic structural flowchart of a mixed speech recognition method according to an embodiment of the present disclosure.

The mixed speech recognition method in the present disclosure is described by using another embodiment. Referring to FIG. 3, the mixed speech recognition method in some embodiments of the present disclosure includes the following steps:

Step 201. Monitor an input of speech.

In some embodiments of the present disclosure, the input of the speech may be monitored by using the microphone array to reduce noise interferences of the speech input. The microphone array may be connected to a computer device in a wired or wireless manner, or embedded in the computer device. After the microphone array detects the speech input, the speech is transmitted to the computer device. The computer device may be various terminal devices, or may be a server.

Step 202. Separately map, in a case that the enrollment speech and the mixed speech are detected in the input speech, a spectrum of the enrollment speech and a spectrum of the mixed speech into a K-dimensional vector space to obtain a vector of each frame of the enrollment speech in each vector dimension and a vector of each frame of the mixed speech in each vector dimension. In other words, the spectrum of a frame of the enrollment speech may be represented by a K-dimensional vector, and the spectrum of a frame of the non-enrollment speech may be represented by a K-dimensional vector.

The enrollment speech is the speech including preset speech information, and K is not less than 1, for example, the K may be 40. K may be an integer.

In some embodiments of the present disclosure, in a case that the computer device detects a speech input including the preset speech information in the input speech, the input of the enrollment speech may be considered to be detected. For example, in the application scenario of a smart speaker, wake-up speech usually needs to be inputted to wake up a speech control function of the smart speaker and the wake-up speech is speech that includes a wake-up word (for example, "Dingdong Dingdong"). Therefore, the wake-up speech may be used as the enrollment speech in the application scenario. In a case that the smart speaker detects the input of the wake-up speech, the input of the enrollment speech may be considered to be detected. The wake-up word may be preset.

The mixed speech is non-enrollment speech inputted after the enrollment speech. In a real intelligent speech interaction scenario, especially under a condition of remote speaking, speech of different speakers often overlaps. Consequently, the input speech is the mixed speech. The mixed speech recognition method in some embodiments of the present disclosure is for determining the speech belonging to the target speaker from the mixed speech.

In step 202, the computer device may map the spectrum of the enrollment speech and the spectrum of the mixed speech to the K-dimensional vector space by a deep neural network to obtain the vector of each frame of the enrollment speech in each vector dimension and the vector of each frame of the mixed speech in each vector dimension. For example, the deep neural network is composed of four layers of bidirectional long short-term memory (LSTM) networks, and each layer of the LSTM network has 600 nodes. Certainly, the deep neural network may be replaced with various other effective new model structures, for example, a model combining a convolutional neural network (CNN) and other network structures, or other network structures, such as a time delay network or a gated convolutional neural network. A model type and a topology structure of the deep neural network are not limited in this embodiment of the present disclosure.

Specifically, the spectrum in some embodiments of the present disclosure may be obtained after performing a short-time Fourier transform on the speech and logarithmizing the result of the short-time Fourier transform.

Step 202 is described below by using an example. The superscript "ws" represents the enrollment speech, the superscript "cs" represents the mixed speech, and "$X_{f,t}$ is a short-time Fourier transform in the log domain, representing the spectrum of the $t^{th}$ frame in the input speech (f represents a sequence number of a spectrum dimension, and t represents a frame sequence number in a time dimension), then the spectrum of the enrollment speech may be represented as $X_{f,t}^{ws}$, and the spectrum of the mixed speech may be represented as $X_{f,t}^{cs}$. In step 202, the input spectrum of the enrollment speech and the input spectrum of the mixed speech may be separately mapped into a K-dimensional vector by the deep neural network, to obtain a vector $V_{k,f,t}^{ws}$, of each frame of the enrollment speech in each vector dimension ($V_{k,f,t}^{ws}$ represents a vector of the $t^{th}$ frame of the enrollment speech in the $k^{th}$ vector dimension, k) and a vector $V_{k,f,t}^{cs}$ of each frame of the mixed speech in each vector dimension ($V_{k,f,t}^{cs}$ represents a vector of the $t^{th}$ frame of the mixed speech in the $k^{th}$ vector dimension, k).

Step 203. Calculate an average vector of the enrollment speech in each vector dimension based on the vector of each frame of the enrollment speech in each vector dimension.

In some embodiments of the present disclosure, by the formula $$A_k^{ws} = \frac{\sum_{f,t} V_{k,f,t}^{ws}}{T_1},$$

the average vector $A_k^{ws}$ of the enrollment speech in each vector dimension may be calculated, T1 representing the number of frames of the enrollment speech.

Alternatively, to remove low-energy spectrum window noise to obtain an effective frame of the enrollment speech, in step 203, the spectrum of the enrollment speech may be compared with a spectrum threshold. If a spectrum amplitude of a frame of the enrollment speech (that is, a time-frequency window) is greater than a spectrum amplitude comparison value, the frame is considered to be the effective frame of the enrollment speech. In step 203, the average vector of the enrollment speech in each vector dimension is calculated based on the vector of the effective frame of the enrollment speech in each vector dimension. The spectrum amplitude comparison value is equal to a difference between the largest spectrum amplitude of the enrollment speech and a preset spectrum threshold. Specifically, a supervised labeling value $Y_{f,t}^{ws}$ of the enrollment speech may be set, and the spectrum of each frame of the enrollment speech is separately compared with a difference between the largest spectrum amplitude and a spectrum threshold $\Gamma$. If a spectrum amplitude of a frame of the enrollment speech (that is, a time-frequency window) is greater than a spectrum amplitude comparison value (that is, a difference between the largest spectrum amplitude of the enrollment speech and $\Gamma$), the supervised labeling value $Y_{f,t}^{ws}$ of the enrollment speech corresponding to the time-frequency window is 1, and otherwise, the value of $Y'^{ws}_{f,t}$ is 0. The specific formula may be expressed as the following first formula:

$$\text{the first formula: } Y_{f,t}^{ws} = \begin{cases} 1, & \text{if } X_{f,t}^{ws} > \max_{f,t}(X_{f,t}^{ws}) - \Gamma \\ 0, & \text{else} \end{cases},$$

the value of $\Gamma$, for example, being 40 dB. The input spectrum of the enrollment speech is mapped into the vector of the K-dimensional (for example, K=40) space by the deep neural network.

The obtaining an average vector of the enrollment speech in each vector dimension based on the vector of the effective frame of the enrollment speech in each vector dimension includes: summing, after the vector of each frame of the enrollment speech in the corresponding vector dimension is multiplied by a supervised labeling value of the corresponding frame, vector dimensions to obtain a total vector of the effective frame of the enrollment speech in the corresponding vector dimension; and separately dividing the total vector of the effective frame of the enrollment speech in each vector dimension by the sum of the supervised labeling values of each frame of the enrollment speech to obtain the average vector of the enrollment speech in each vector dimension. Specifically, the obtaining an average vector of the enrollment speech in each vector dimension based on the vector of the effective frame of the enrollment speech in each vector dimension may be implemented by the following second formula:

$$\text{the second formula: } A_k^{ws} = \frac{\sum_{f,t} V_{k,f,t}^{ws} \times Y_{f,t}^{ws}}{\sum_{f,t} Y_{f,t}^{ws}},$$

$A_k^{ws}$ representing the average vector of the enrollment speech in the vector dimension k, and k∈[1, K].

Step 204. Use the average vector of the enrollment speech in each vector dimension as a speech extractor of the target speaker in each vector dimension and separately measure a distance between the vector of each frame of the mixed speech in each vector dimension and the speech extractor of the corresponding vector dimension to estimate a mask of each frame in the mixed speech.

In step 204, the computer device estimates the mask of each frame of the mixed speech by measuring the distance between the vector of each frame of the mixed speech in each vector dimension and the speech extractor, to recover the speech of the target speaker. The estimation method is shown as the third formula:

$$\text{the third formula: } M_{f,t}^{cs} = \text{Sigmoid}\left(\sum_k A_k^{ws} \times V_{k,f,t}^{cs}\right);$$

in the third formula, $M_{f,t}^{cs}$ represents a mask of the $t^{th}$ frame of the mixed speech, and for $A_k^{ws}$ and $V_{k,f,t}^{cs}$ foregoing description.

If an inner product distance between a vector of a frame of the mixed speech (that is, a time-frequency window) and the speech extractor is smaller, the probability that the frame belongs to the target speaker is larger. Correspondingly, a mask that corresponds to the time-frequency window and that is estimated by the third formula is larger.

Step 205. Determine the speech belonging to the target speaker in the mixed speech based on the mask of each frame of the mixed speech.

In some embodiments of the present disclosure, after the mask of each frame of the mixed speech is obtained, the speech belonging to the target speaker in the mixed speech may be determined based on the mask of each frame of the mixed speech. Specifically, by using the mask to weight the mixed speech, the speech belonging to the target speaker in the mixed speech may be extracted frame by frame, and a larger mask indicates more speech that is of the corresponding time-frequency window and that is extracted.

In the embodiment shown in FIG. 3, the average vector of the enrollment speech in each vector dimension is used as the speech extractor of the target speaker in each vector dimension. Certainly, in other embodiments, the speech extractor of the target speaker in each vector dimension may be selected in other manners.

For example, the mixed speech includes speeches of multiple speakers, and an alternative solution may be: after step 202, based on a clustering algorithm (for example, a K-means algorithm), the vector of each frame of the mixed speech in each vector dimension is processed to determine, for each of the multiple speakers in the mixed speech, a centroid vector corresponding to the speaker in each vector dimension. Step 204 is replaced with: use a target centroid vector of the mixed speech in each vector dimension as a speech extractor of the target speaker in the corresponding vector dimension and separately measure a distance between the vector of each frame of the mixed speech in each vector dimension and the speech extractor of a corresponding vector dimension to estimate a mask of each frame of the mixed speech, the target centroid vector being a centroid vector that has the smallest distance with the average vector of the enrollment speech in the same vector dimension.

In another example, another alternative solution may be: after step 203, a distance between M preset speech extractors is separately compared with the average vector of the enrollment speech in each vector dimension, M being greater than 1; Step 204 is replaced with: use a speech extractor with the smallest distance from the average vector of the enrollment speech in a vector dimension in the M speech extractors as a speech extractor of the target speaker in the corresponding vector dimension and separately measure a distance between the vector of each frame of the mixed speech in each vector dimension and the speech extractor of the corresponding vector dimension to estimate a mask of each frame of the mixed speech.

To implement the mixed speech recognition process shown in FIG. 3, in some embodiments of the present disclosure, a recognition network for implementing the mixed speech recognition process may be pre-built and the recognition network is trained.

Figure 4A:
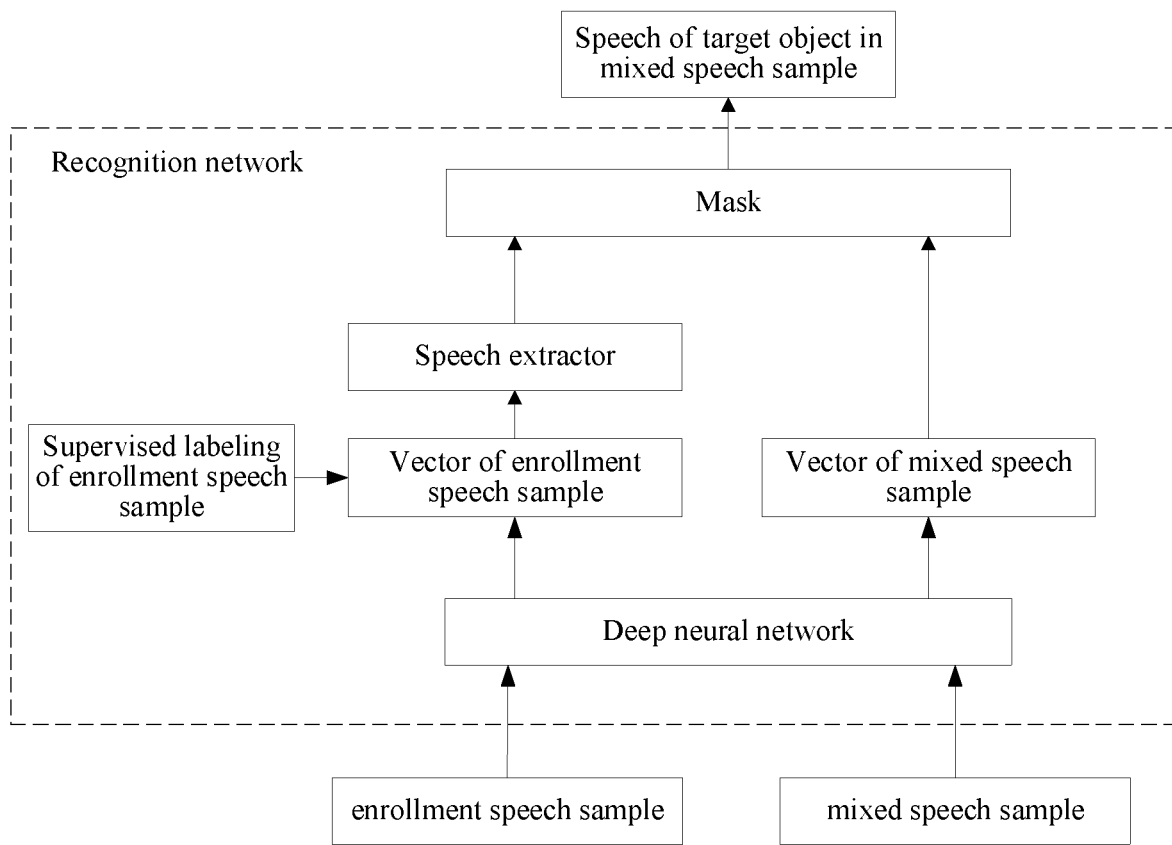
FIG. 4a is a schematic structural diagram of a recognition network according to an embodiment of the present disclosure.

In an application scenario, the schematic structural diagram of the recognition network is shown as FIG. 4a. The training process of the recognition network is described with reference to FIG. 4a:

1. An enrollment speech sample and a mixed speech sample that are used for training the recognition network are inputted into a deep neural network. The deep neural network is composed of four layers of bidirectional LSTM networks, and each layer of the LSTM network has 600 nodes. Certainly, the deep neural network may be replaced with various other effective new model structures, for example, a model combining a CNN and other network structures, or other network structures, such as a time delay network or a gated convolutional neural network. A model type and a topology structure of the deep neural network are not limited in the present disclosure.

In the application scenario, the superscript "ws'" represents the enrollment speech sample, the superscript "cs'" represents the mixed speech sample. "$X_{f,t}$" is a short-time Fourier transform in the log domain, representing the spectrum of the $t^{th}$ frame in the input speech (f represents a sequence number of a spectrum dimension, and t represents a frame sequence number in a time dimension). Then the spectrum of the enrollment speech sample may be represented as $X_{f,t}^{ws'}$, and the spectrum of the mixed speech sample may be represented as $X_{f,t}^{cs'}$. Then the input spectrum $X_{f,t}^{ws'}$ of the enrollment speech sample and the input spectrum $X_{f,t}^{cs'}$ of the mixed speech sample may be separately mapped into a K-dimensional vector by the deep neural network, to obtain a vector $V_{k,f,t}^{ws'}$ of each frame of the enrollment speech sample in each vector dimension ($V_{k,f,t}^{ws'}$ represents a vector of the $t^{th}$ frame of the enrollment speech sample in the $k^{th}$ vector dimension, k) and a vector $V_{k,f,t}^{cs'}$ of each frame of the mixed speech sample in each vector dimension ($V_{k,f,t}^{cs'}$ represents a vector of the $t^{th}$ frame of the mixed speech sample in the $k^{th}$ vector dimension, k).

2. To remove low-energy spectrum window noise to obtain an effective frame of the enrollment speech, a supervised labeling value $Y_{f,t}^{ws'}$ of the enrollment speech sample is set, and the spectrum of each frame of the enrollment speech sample is separately compared with a difference between the largest spectrum amplitude and a spectrum threshold $\Gamma$. If a spectrum amplitude of a frame of the enrollment speech sample (that is, a time-frequency window) is greater than a spectrum amplitude comparison value (that is, a difference between the largest spectrum amplitude of the enrollment speech sample and $\Gamma$), the supervised labeling value $Y_{f,t}^{ws'}$ of the enrollment speech sample corresponding to the time-frequency window is 1, and otherwise, the value of $Y_{f,t}^{ws'}$ 0. The specific formula may be expressed as the following fourth formula.

The fourth formula: $Y_{f,t}^{ws'} = \begin{cases} 1, & \text{if } X_{f,t}^{ws'} > \max_{f,t}(X_{f,t}^{ws'}) - \Gamma \\ 0, & \text{else} \end{cases}$ ;

In the present disclosure scenario, the vector $V_{k,f,t}^{ws'}$ and the supervised labeling value $Y_{f,t}^{ws'}$ of the enrollment speech sample are used for estimating the speech extractor $A_k^{ws'}$ of the target speaker in the vector space. After the vector of each frame of the enrollment speech in the corresponding vector dimension is multiplied by a supervised labeling value of the corresponding frame, vector dimensions are summed to obtain a total vector of the effective frame of the enrollment speech in the corresponding vector dimension; and the total vector of the effective frame of the enrollment speech in each vector dimension is separately divided by the sum of the supervised labeling values of each frame of the enrollment speech to obtain the average vector of the enrollment speech in each vector dimension. The calculation method may be shown as the fifth formula.

The fifth formula: $A_k^{ws'} = \dfrac{\sum_{f,t} V_{k,f,t}^{ws'} \times Y_{f,t}^{ws'}}{\sum_{f,t} Y_{f,t}^{ws'}}$.

The value of $\Gamma$, for example, is 40 dB. The input spectrum of the enrollment speech is mapped as the vector of the K-dimensional (for example, K=40) space by the deep neural network.

3. By measuring a distance between the vector of each frame of the mixed speech sample in each vector dimension and the speech extractor $A_k^{ws'}$, the mask of the target speaker is estimated and recovered. The estimation method is shown as the sixth formula. If an inner product distance between a time-frequency window and the speech extractor is smaller, the probability that the time-frequency window belongs to the target speaker is larger. Then the mask that corresponds to the time-frequency window and that is estimated by the sixth formula is larger, and more speech of the corresponding time-frequency window in the mixed speech sample is extracted.

The sixth formula: $M_{f,t}^{cs'} = \text{Sigmoid}\left(\sum_k A_k^{ws'} \times V_{k,f,t}^{cs'}\right)$.

In the sixth formula, $M_{f,t}^{cs'}$ represents a mask of the $t^{th}$ frame of the mixed speech sample, and for $A_k^{ws'}$ and $V_{k,f,t}^{cs'}$, reference may be made to the foregoing description.

4. A spectral error between the speech of target speaker recovered by the estimated mask and reference speech of the target speaker is reconstructed by an objective function of the recognition network, and then the entire network is trained by minimizing the objective function. The objective function L may be shown as the seventh formula.

The seventh formula: $L = \sum_{f,t} \left\| S_{f,t}^{cs'} - X_{f,t}^{cs'} \times M_{f,t}^{cs'} \right\|_2^2$.

In the seventh formula, $s_{f,t}^{cs'}$ represents a spectrum of the reference speech of the target speaker in the $t^{th}$ frame (that is, a spectrum of the reference speech). The seventh formula is a standard reconstruction error of L2. Because the reconstruction error reflects the spectral error between the recovered speech and the reference speech of the target speaker, a global error may be reduced by generating a gradient in a case that the recognition network is trained, to optimize the quality of the extracted speech of the target speaker.

Figure 4B:
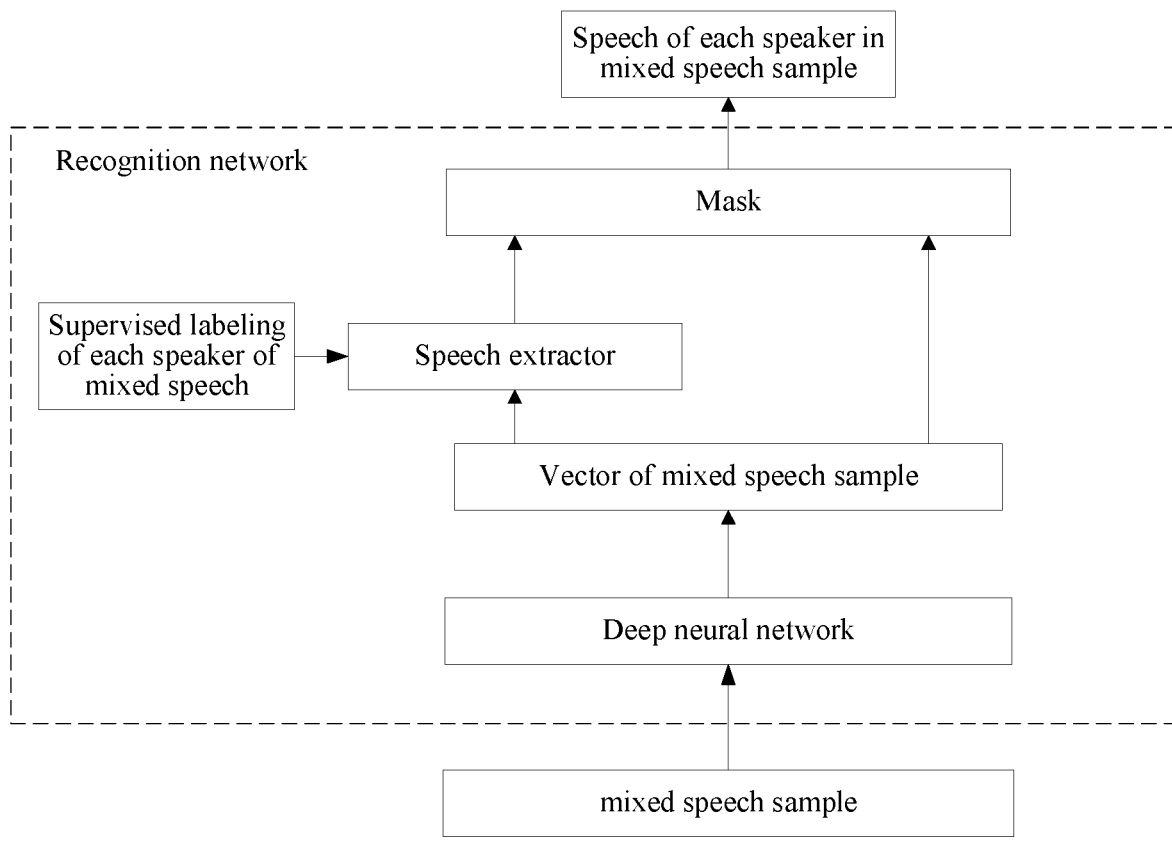
FIG. 4b is a schematic structural diagram of another recognition network according to an embodiment of the present disclosure.

In another application scenario, the schematic structural diagram of the recognition network may alternatively be shown as FIG. 4b. In the present disclosure scenario, the training process of the recognition network does not need the input of the enrollment speech sample, that is, a target speaker and an interference object are not distinguished from each other. The training process of the recognition network is described below with reference to FIG. 4b:

1. Assuming that there is speech of a total of C speakers in the mixed speech sample, to obtain a supervised labeling value of $Y_{c,f,t}$ of each speaker, a low energy spectrum window noise in the mixed speech sample may be removed first, and then for the speech spectrum amplitude of each speaker of the mixed speech sample, if a speech spectrum amplitude of a speaker in a frame is greater than spectrum amplitudes of other speakers in the frame, a value of corresponding $Y_{c,f,t}$ of the speaker in the frame is 1, and otherwise the value is 0.

In the application scenario, "$X_{c,f,t}$," is a short-time Fourier transform in the log domain, indicating the spectrum of the $t^{th}$ frame of speech of the mixed speech. The input spectrum $X_{c,f,t}$ of the mixed speech sample is mapped as a K-dimensional vector by the deep neural network to obtain a vector $V_{k,f,t}$ of each frame of the mixed speech sample in each vector dimension ($V_{k,f,t}$ represents a vector of the $t^{th}$ frame of the mixed speech sample in the $k^{th}$ vector dimension, k). The deep neural network is composed of four layers of bidirectional LSTM networks, and each layer of the LSTM network has 600 nodes. Certainly, the deep neural network may be replaced with various other effective new model structures, for example, a model combining a CNN and other network structures, or other network structures, such as a time delay network or a gated convolutional neural network. A model type and a topology structure of the deep neural network are not limited in the present disclosure.

2. The vector $V_{k,f,t}$ and the supervised labeling value $Y_{c,f,t}$ of the mixed speech sample are used for estimating the speech extractor $A_{c,k}$ of each speaker in the vector space. The calculation method is shown as the eighth formula.

The eighth formula: $A_{c,k} = \dfrac{\sum_{f,t} V_{k,f,t} \times Y_{c,f,t}}{\sum_{f,t} Y_{c,f,t}}$.

3. By measuring the distance between the vector of each frame of the mixed speech sample in each vector dimension and the speech extractor, the mask of each speaker is estimated. The estimation method is shown as the ninth formula.

$$\text{The ninth formula: } M_{c,f,t} = \text{Sigmoid}\left(\sum_k A_{c,k} \times V_{k,f,t}\right).$$

In the ninth formula, $M_{c,f,t}$ represents a mask that is related to a speaker c and that is in the $t^{th}$ frame in the mixed speech sample, and for $A_{c,k}$ and $V_{k,f,t}$, reference may be made to the foregoing description.

4. The mask of each speaker is used for extracting speech of each speaker in the mixed speech sample.

5. A spectral error between the speech of each speaker recovered by the estimated mask and reference speech of the corresponding speaker is reconstructed by the objective function of the recognition network, and then the entire network is trained by minimizing the objective function. The objective function L may be shown as the tenth formula.

$$\text{The tenth formula: } L = \sum_{c,f,t} \|S_{c,f,t} - X_{f,t} \times M_{c,f,t}\|_2^2.$$

In the tenth formula, $S_{c,f,t}$ represents a spectrum of the reference speech of the speaker c in the $t^{th}$ frame (that is, a spectrum of the reference speech). The tenth formula is a standard reconstruction error of L2. Because the reconstruction error reflects the spectral error between the recovered speech of each speaker and the reference speech of the corresponding speaker, a global error may be reduced by generating a gradient in a case that the recognition network is trained, to optimize the quality of the extracted speech of all speakers.

It can be learned from the foregoing that, in some embodiments of the present disclosure, in a case that an input of enrollment speech and mixed speech is detected, a spectrum of the enrollment speech and a spectrum of the mixed speech are separately embedded into a K-dimensional vector space, a speech extractor is determined for a target speaker based on the enrollment speech, then a mask of each frame of the mixed speech is estimated by measuring a distance between the vector of each frame of the mixed speech in each vector dimension and the speech extractor of a corresponding vector dimension, and finally speech belonging to the target speaker in the mixed speech is determined based on the mask. By introducing speech features of a target speaker learned by enrollment speech, in some embodiments of the present disclosure, the speech of the target speaker may be determined in the mixed speech, to facilitate tracking the speech of the target speaker in the mixed speech. For example, in the application scenario of a smart speaker, wake-up speech may be used as the enrollment speech to learn features of a speaker (that is, the target speaker) of the wake-up speech, and speech belonging to the speaker of the wake-up speech is recognized and tracked in the mixed speech that is inputted after the wake-up speech. In addition, because the determining of the speech extractor in the present disclosure does not depend on the number of speakers in the mixed speech, in some embodiments of the present disclosure, the number of speakers in the mixed speech does not need to be learned in advance or estimated during the mixed speech recognition process.

The mixed speech recognition method in the present disclosure is described below by using another embodiment.

Figure 5:
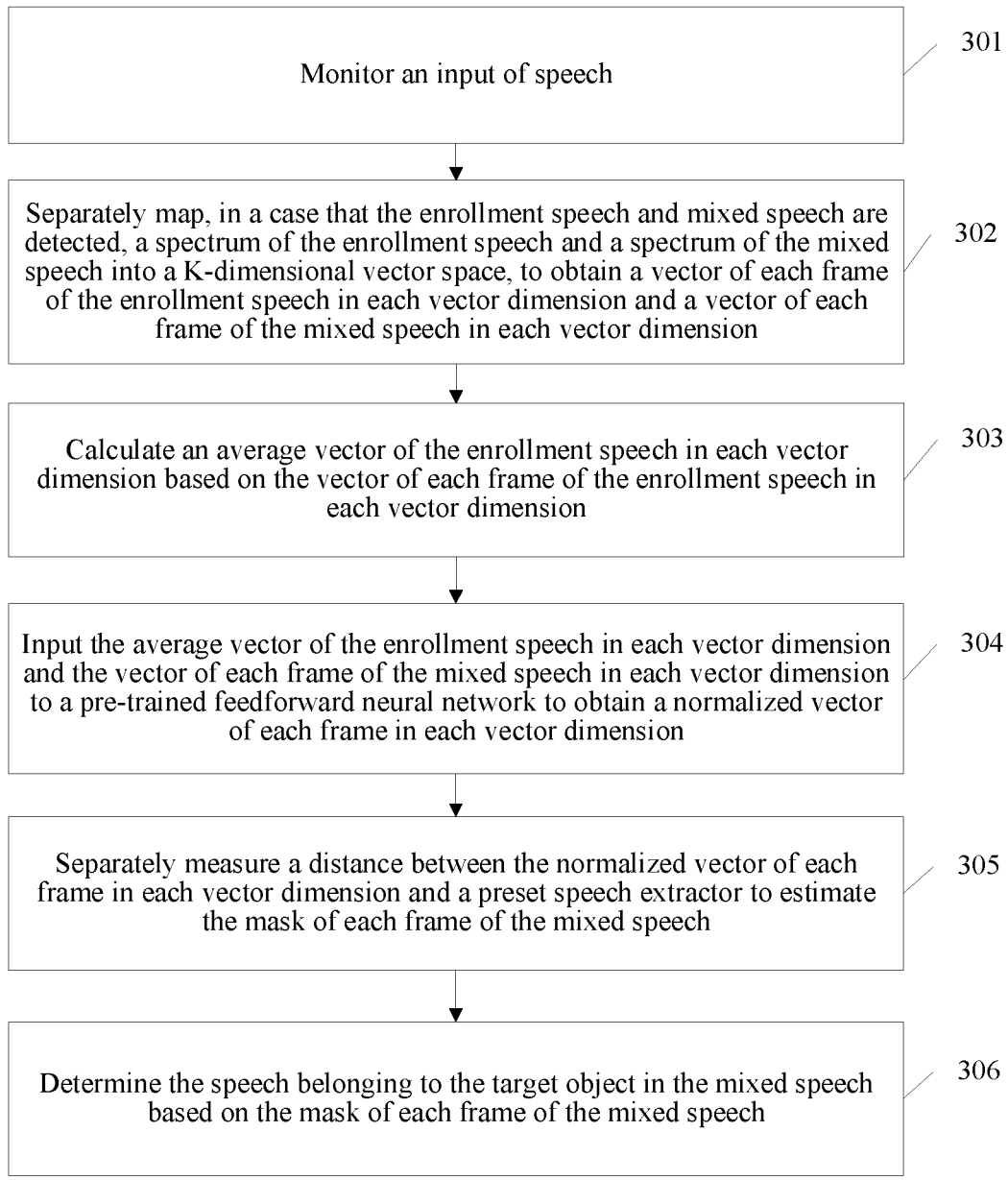
FIG. 5 is still another schematic structural flowchart of a mixed speech recognition method according to an embodiment of the present disclosure.

The difference between this embodiment and the embodiment shown in FIG. 3 is that, in this embodiment, a feedforward neural network is introduced into a recognition network (that is, a network used for implementing the mixed speech recognition) to map an original vector space to a normalized vector space, so that the distribution of speech extractors trained by the recognition network is relatively more concentrated and stable. As shown in FIG. 5, the mixed speech recognition method in some embodiments of the present disclosure includes the following steps:

Step 301. Monitor an input of speech.

In some embodiments of the present disclosure, the input of the speech may be monitored by using a microphone array to reduce noise interferences of the speech input. The microphone array may be connected to a computer device in a wired or wireless manner, or embedded in the computer device. After the microphone array detects the speech input, the speech is transmitted to the computer device.

Step 302. Separately embed, in a case that the enrollment speech and the mixed speech are detected in the input speech, a spectrum of the enrollment speech and a spectrum of the mixed speech into a K-dimensional vector space to obtain a vector of each frame of the enrollment speech in each vector dimension and a vector of each frame of the mixed speech in each vector dimension.

The enrollment speech is the speech including preset speech information, and K is not less than 1, for example, the K may be 40.

In some embodiments of the present disclosure, in a case that the computer device detects a speech input including the preset speech information in the input speech, the input of the enrollment speech may be considered to be detected. For example, in the application scenario of a smart speaker, wake-up speech usually needs to be inputted to wake up a speech control function of the smart speaker and the wake-up speech is speech that includes a wake-up word (for example, "Dingdong Dingdong"). Therefore, the wake-up speech may be used as the enrollment speech in the application scenario. In a case that the smart speaker detects the input of the wake-up speech, the input of the enrollment speech may be considered to be detected.

The mixed speech is non-enrollment speech inputted after the enrollment speech. In a real intelligent speech interaction scenario, especially under a condition of remote speaking, speech of different speakers often overlaps. Consequently, the input speech is the mixed speech. The mixed speech recognition method in some embodiments of the present disclosure is for determining the speech belonging to the target speaker from the mixed speech.

In step 302, a computer device may map the spectrum of the enrollment speech and the spectrum of the mixed speech to the K-dimensional vector space by a deep neural network to obtain the vector of each frame of the enrollment speech in each vector dimension and the vector of each frame of the mixed speech in each vector dimension. For example, the deep neural network is composed of four layers of bidirectional LSTM networks, and each layer of the LSTM network has 600 nodes. Certainly, the deep neural network may be replaced with various other effective new model structures, for example, a model combining a convolutional neural network (CNN) and other network structures, or other network structures, such as a time delay network or a gated convolutional neural network. A model type and a topology structure of the deep neural network are not limited in this embodiment of the present disclosure.

Specifically, the spectrum in some embodiments of the present disclosure may be obtained after performing a short-time Fourier transform on the speech and logarithmizing the result of the short-time Fourier transform.

Step 302 is described below by using an example. The superscript "WS" represents the enrollment speech, the superscript "cs" represents the mixed speech, and "$X_{f,t}$ is a short-time Fourier transform in the log domain, representing the spectrum of the $t^{th}$ frame in the input speech (f represents a sequence number of a spectrum dimension, and t represents a frame sequence number in a time dimension), then the spectrum of the enrollment speech may be represented as $X_{f,t}^{ws}$, and the spectrum of the mixed speech may be represented as $X_{f,t}^{cs}$. In step 302, the input spectrum $X_{f,t}^{ws}$ of the enrollment speech and the input spectrum $X_{f,t}^{cs}$ of the mixed speech may be separately mapped into a K-dimensional vector by the deep neural network, to obtain a vector $V_{k,f,t}^{ws}$ of each frame of the enrollment speech in each vector dimension ($V_{k,f,t}^{ws}$ represents a vector of the $t^{th}$ frame of the enrollment speech in the $k^{th}$ vector dimension, k) and a vector $V_{k,f,t}^{cs}$ of each frame of the mixed speech in each vector dimension ($V_{k,f,t}^{cs}$ represents a vector of the $t^{th}$ frame of the mixed speech in the $k^{th}$ vector dimension, k).

Step 303. Calculate an average vector of the enrollment speech in each vector dimension based on the vector of each frame of the enrollment speech in each vector dimension.

In some embodiments of the present disclosure, by the formula $$A_k^{ws} = \frac{\sum_{f,t} V_{k,f,t}^{ws}}{T_1},$$

the average vector of the enrollment speech in each vector dimension may be calculated, T1 representing the number of frames of the enrollment speech.

Alternatively, to remove low-energy spectrum window noise to obtain an effective frame of the enrollment speech, in step 303, the spectrum of the enrollment speech may be compared with a spectrum threshold. If a spectrum amplitude of a frame of the enrollment speech (that is, a time-frequency window) is greater than a spectrum amplitude comparison value, the frame is considered to be the effective frame of the enrollment speech. In step 303, the average vector of the enrollment speech in each vector dimension is calculated based on the vector of the effective frame of the enrollment speech in each vector dimension. The spectrum amplitude comparison value is equal to a difference between the largest spectrum amplitude of the enrollment speech and a preset spectrum threshold. Specifically, a supervised labeling value $Y_{f,t}^{ws}$ of the enrollment speech may be set, and the spectrum of each frame of the enrollment speech is separately compared with a difference between the largest spectrum amplitude and a spectrum threshold Γ. If a spectrum amplitude of a frame of the enrollment speech (that is, a time-frequency window) is greater than a spectrum amplitude comparison value (that is, a difference between the largest spectrum amplitude of the enrollment speech and Γ), the supervised labeling value $Y_{f,t}^{ws}$ of the enrollment speech corresponding to the time-frequency window is 1, and otherwise, the value of $Y_{f,t}^{ws}$ is 0. For the specific formula, reference may be made to the first formula. The step of calculating an average vector of the enrollment speech in each vector dimension based on the vector of the effective frame of the enrollment speech in each vector dimension may be implemented by the second formula.

Step 304. Input the average vector of the enrollment speech in each vector dimension and the vector of each frame of the mixed speech in each vector dimension to a pre-trained feedforward neural network to obtain a normalized vector of each frame in each vector dimension.

In some embodiments of the present disclosure, the feedforward neural network may be a two-layer network, and the number of nodes in each layer may be 256. Description is further provided by using the foregoing example. A 2K-dimensional vector combined by the average vector $A_k^{ws}$ of the enrollment speech in each vector dimension and the vector $V_{k,f,t}^{cs}$ of each frame of the mixed speech in each vector dimension is inputted to the feedforward neural network, to output a K-dimensional normalized vector $\tilde{V}_{k,f,t}$. Specifically, a function of the feedforward neural network may be shown as the eleventh formula.

The eleventh formula: $\tilde{V}_{k,f,t} = f([A_k^{ws}, V_{k,f,t}^{cs}])$.

In the eleventh formula, f(□) represents a nonlinear mapping function learned through the deep neural network, and the function of the nonlinear mapping function is to map an original vector space to a new vector space (that is, the normalized vector space).

Step 305. Separately measure a distance between the normalized vector of each frame in each vector dimension and a preset speech extractor to estimate the mask of each frame of the mixed speech.

Because the speech extractors trained by the recognition network in some embodiments of the present disclosure have the feature of stable and concentrate distribution, in some embodiments of the present disclosure, centroids of all the speech extractors obtained in a case that the recognition network is trained may be used as preset speech extractors. Because the speech extractor does not need to be re-estimated during the mixed speech recognition process in this embodiment of the present disclosure, the mixed speech recognition method in this embodiment of the present disclosure can better implement frame-by-frame real-time processing.

Step 306. Determine the speech belonging to the target speaker in the mixed speech based on the mask of each frame of the mixed speech.

In some embodiments of the present disclosure, after the mask of each frame of the mixed speech is obtained, the speech belonging to the target speaker in the mixed speech may be determined based on the mask of each frame of the mixed speech. Specifically, by using the mask to weight the mixed speech, the speech belonging to the target speaker in the mixed speech may be extracted frame by frame, and a larger mask indicates more speech that is of the corresponding time-frequency window and that is extracted.

Figure 6:
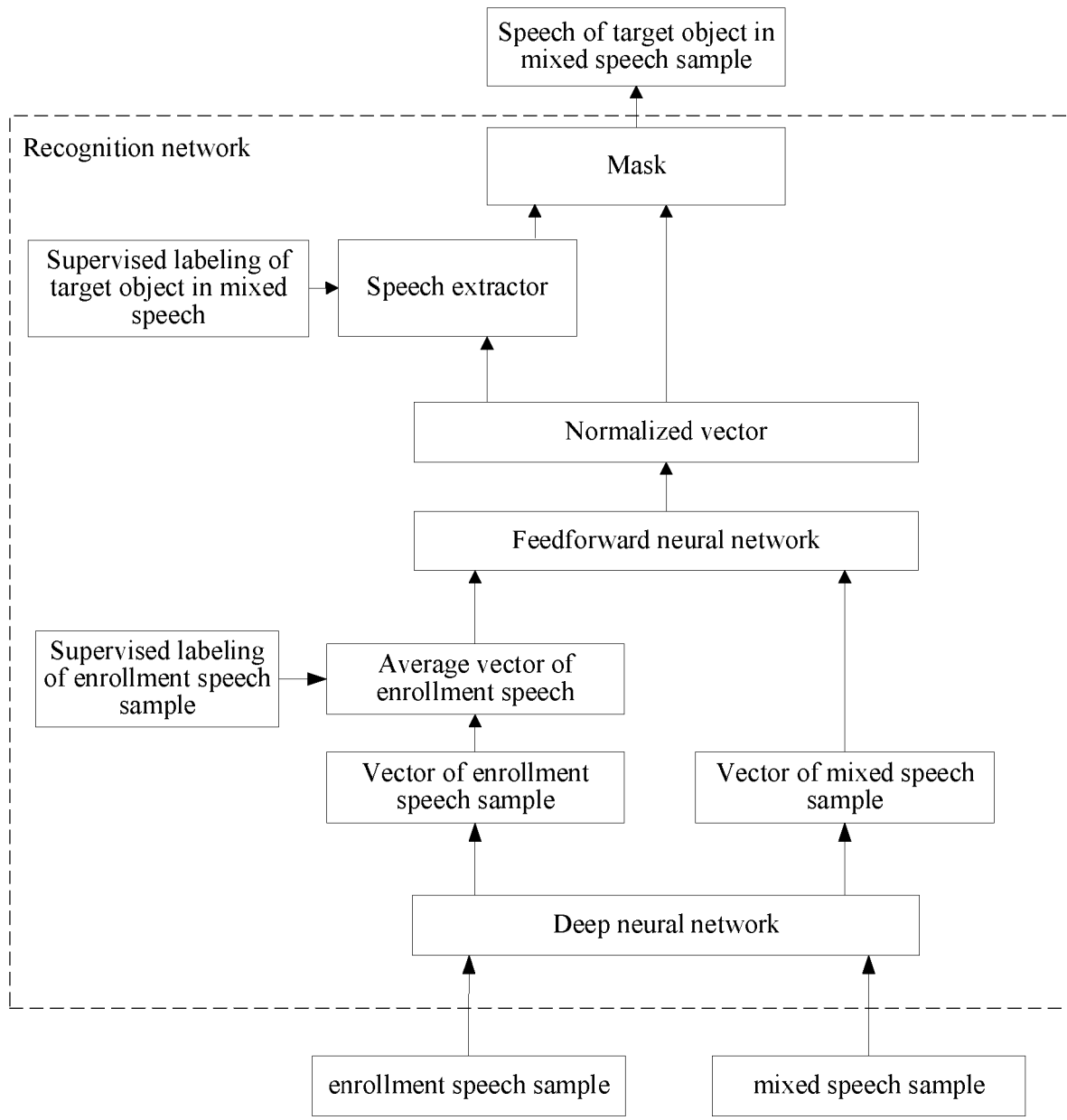
FIG. 6 is a schematic structural diagram of still another recognition network according to an embodiment of the present disclosure.

The recognition network used for implementing the mixed speech recognition process shown in FIG. 5 is described below. A schematic structural diagram of the recognition network is shown in FIG. 6. The training process of the recognition network is described below with reference to FIG. 6:

1. An enrollment speech sample and a mixed speech sample that are used for training the recognition network are inputted into a deep neural network. The deep neural network is composed of four layers of bidirectional LSTM networks, and each layer of the LSTM network has 600 nodes. Certainly, the deep neural network may be replaced with various other effective new model structures, for example, a model combining a CNN and other network structures, or other network structures, such as a time delay network or a gated convolutional neural network. A model type and a topology structure of the deep neural network are not limited in the present disclosure.

In the present disclosure scenario takes, superscript "ws'" represents the enrollment speech sample, the superscript "cs'" represents the mixed speech sample. "$X_{f,t}$" is a short-time Fourier transform in the log domain, representing the spectrum of the $t^{th}$ frame in the input speech (f represents a sequence number of a spectrum dimension, and t represents a frame sequence number in a time dimension). Then the spectrum of the enrollment speech sample may be represented as $X_{f,t}^{ws'}$, and the spectrum of the mixed speech sample may be represented as $X_{f,t}^{cs'}$. Then the input spectrum $X_{f,t}^{ws'}$ of the enrollment speech sample and the input spectrum $X_{f,t}^{cs'}$ of the mixed speech sample may be separately mapped into a K-dimensional vector by the deep neural network, to obtain a vector of each frame of the enrollment speech sample in each vector dimension ($V_{k,f,t}^{ws'}$ represents a vector of the $t^{th}$ frame of the enrollment speech sample in the $k^{th}$ vector dimension, k) and a vector $V_{k,f,t}^{cs'}$ of each frame of the mixed speech sample in each vector dimension ($V_{k,f,t}^{cs'}$ represents a vector of the $t^{th}$ frame of the mixed speech sample in the $k^{th}$ vector dimension, k).

2. To remove low-energy spectrum window noise to obtain an effective frame of the enrollment speech, a supervised labeling value of the enrollment speech sample is set, and the spectrum of each frame of the enrollment speech sample is separately compared with a difference between the largest spectrum amplitude and a spectrum threshold Γ. If a spectrum amplitude of a frame of the enrollment speech sample (that is, a time-frequency window) is greater than a spectrum amplitude comparison value (that is, a difference between the largest spectrum amplitude of the enrollment speech sample and Γ), the supervised labeling value $Y_{f,t}^{ws'}$ of the enrollment speech corresponding to the time-frequency window is 1, and otherwise, the value of $Y_{f,t}^{ws'}$ 0. The specific formula may be expressed as the foregoing fourth formula.

In the present disclosure scenario, the average vector $A_k^{ws'}$ of the enrollment speech in each vector dimension is calculated based on the vector $V_{k,f,t}^{ws'}$ of each frame of the enrollment speech in each vector dimension and the supervised labeling value $Y_{f,t}^{ws'}$. The calculation method is shown as the fifth formula.

3. A 2K-dimensional vector combined by the average vector $A_k^{ws'}$ of the enrollment speech in each vector dimension and the vector $V_{k,f,t}^{cs'}$ of each frame of the mixed speech in each vector dimension is inputted to the feedforward neural network, to output a K-dimensional normalized vector $\tilde{V}_{k,f,t}$. Specifically, a function of the feedforward neural network may be shown as the eleventh formula. For the description of the feedforward neural network, reference may be made to the description in step 304. Details are not described herein again.

4. To obtain a supervised labeling value $Y_{f,t}^{cs'}$ of the target speaker in the mixed speech sample, a low energy spectrum window noise in the mixed speech sample may be removed first, and then for a speech spectrum amplitude of the target speaker in the mixed speech sample, if the speech spectrum amplitudes of the target speaker in a frame are all greater than the spectrum amplitudes of the interference object in the frame, the target speaker takes 1 in the $Y_{f,t}^{cs'}$ corresponding to the frame, and otherwise takes 0.

5. Based on a normalized vector $\tilde{V}_{k,f,t}$ and a supervised labeling value $Y_{f,t}^{cs'}$ of the target speaker in the mixed speech, a normalized speech extractor $\tilde{A}_k$ is estimated by the twelfth formula.

The twelfth formula: $\tilde{A}_{jk} = \dfrac{\sum_{f,t} \tilde{V}_{k,f,t} \times Y_{f,t}^{cs'}}{\sum_{f,t} Y_{f,t}^{cs'}}$.

6. By measuring a distance between the normalized vector $\tilde{V}_{k,f,t}$ of each frame in each vector dimension and the normalized speech extractor $\tilde{A}_k$, the mask of the target speaker is estimated and recovered. The estimation method is shown as the thirteenth formula. If an inner product distance between a time-frequency window and the speech extractor is smaller, the probability that the time-frequency window belongs to the target speaker is larger. Then the mask that corresponds to the time-frequency window and that is estimated by the thirteenth formula is larger, and more speech of the corresponding time-frequency window in the mixed speech sample is extracted.

The thirteenth formula: $\tilde{M}_{f,t} = \mathrm{Sigmoid}\left(\sum_k \tilde{A}_k \times \tilde{V}_{k,f,t}\right)$.

In the thirteenth formula, $\tilde{M}_{f,t}$ represents a mask of the $t^{th}$ frame of the mixed speech sample.

7. A spectral error between the speech of the target speaker recovered by the estimated mask and reference speech of the target speaker is reconstructed by an objective function of the recognition network, and then the entire network is trained by minimizing the objective function. The objective function L may be shown as the fourteenth formula.

The fourteenth formula: $L = \sum_{f,t} \|S_{f,t}^{cs'} - X_{f,t}^{cs'} \times \tilde{M}_{f,t}\|_2^2$.

In the fourteenth formula, $S_{f,t}^{cs'}$ represents the spectrum of the reference speech of the target speaker in the $t^{th}$ frame (that is, the spectrum of the reference speech). The fourteenth formula is a standard L2 reconstruction error. Because the reconstruction error reflects the spectral error between the recovered speech and the reference speech of the target speaker, a global error may be reduced by generating a gradient in a case that the recognition network is trained, to optimize the quality of the extracted speech of the target speaker.

Different from the mixed speech sample, in actual mixed speech recognition, because the speech that belongs to the target speaker in the input mixed speech is unknown, the supervised labeling value of the target speaker in the mixed speech is unknown. Therefore, as mentioned above, centroids of all the speech extractors obtained in a case that the recognition network is trained may be used as preset speech extractors. In step 305 of the embodiment shown in FIG. 5, measure, a distance between the normalized vector of each frame in each vector dimension and a preset speech extractor is separately measured to estimate the mask of each frame of the mixed speech.

Figure 7:
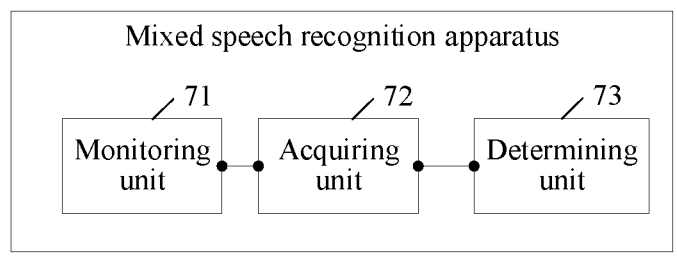
FIG. 7 is a schematic structural diagram of a mixed speech recognition apparatus according to an embodiment of the present disclosure.

An embodiment of the present disclosure provides a mixed speech recognition apparatus. As shown in FIG. 7, the mixed speech recognition apparatus in some embodiments of the present disclosure includes:

a monitoring unit 71, configured to monitor an input of speech;

an acquiring unit 72, configured to acquire, in a case that an input of enrollment speech and mixed speech is detected by the monitoring unit 71, speech features of a target speaker based on the enrollment speech; and a determining unit 73, configured to determine speech belonging to the target speaker in the mixed speech based on the speech features of the target speaker;

the enrollment speech being speech including preset speech information and the mixed speech being non-enrollment speech inputted after the enrollment speech.

Figure 8:
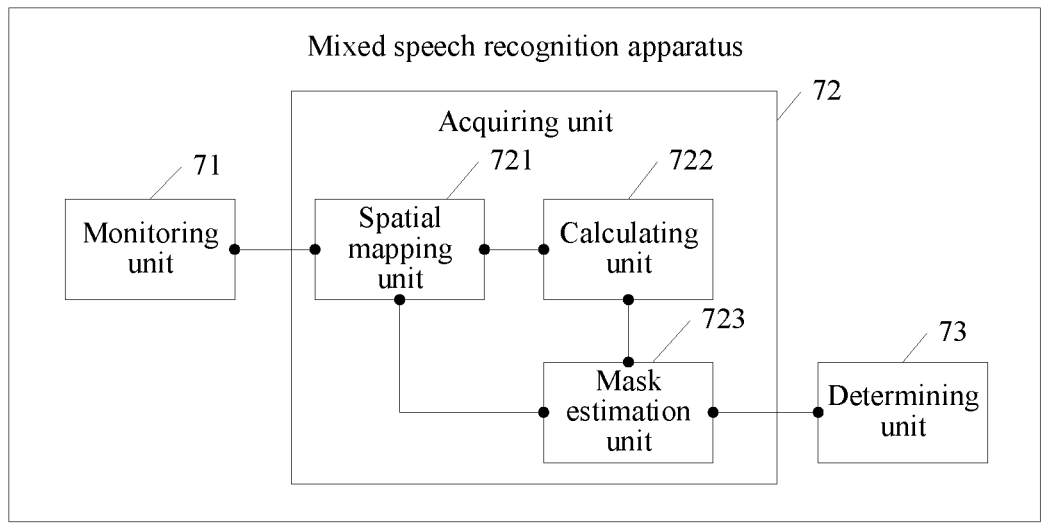
FIG. 8 is another schematic structural diagram of a mixed speech recognition apparatus according to an embodiment of the present disclosure.

Based on the embodiment shown in FIG. 7, as shown in FIG. 8, the acquiring unit 72 may include:

a spatial mapping unit 721, configured to separately embed a spectrum of the enrollment speech and a spectrum of the mixed speech into a K-dimensional vector space to obtain a vector of each frame of the enrollment speech in each vector dimension and a vector of each frame of the mixed speech in each vector dimension in a case that the input of the enrollment speech and the mixed speech is detected by the monitoring unit 71, the enrollment speech being the speech including the preset speech information, the mixed speech being the non-enrollment speech inputted after the enrollment speech and K being not less than 1;

a calculating unit 722, configured to calculate an average vector of the enrollment speech in each vector dimension based on the vector of each frame of the enrollment speech in each vector dimension;

a mask estimation unit 723, configured to use the average vector of the enrollment speech in each vector dimension as a speech extractor of the target speaker in each vector dimension and separately measure a distance between the vector of each frame of the mixed speech in each vector dimension and the speech extractor of a corresponding vector dimension to estimate a mask of each frame of the mixed speech; and a determining unit 73, configured to determine the speech belonging to the target speaker in the mixed speech based on a mask of each frame of the mixed speech.

Optionally, the calculating unit 722 is specifically configured to: calculate the average vector of the enrollment speech in each vector dimension based on the vector of an effective frame of the enrollment speech in each vector dimension, the effective frame of the enrollment speech being a frame in the enrollment speech with a spectrum amplitude greater than a spectrum amplitude comparison value, and the spectrum amplitude comparison value being equal to a difference between a largest spectrum amplitude of the enrollment speech and a preset spectrum threshold.

Optionally, the mixed speech recognition apparatus in some embodiments of the present disclosure further includes: a normalization unit, configured to input the average vector of the enrollment speech in each vector dimension and the vector of each frame of the mixed speech in each vector dimension to a pre-trained feedforward neural network to obtain a normalized vector of each frame in each vector dimension. The mask estimation unit 723 is specifically configured to: separately measure a distance between the normalized vector of each frame in each vector dimension and a preset speech extractor to estimate the mask of each frame of the mixed speech.

Optionally, the mixed speech recognition apparatus in some embodiments of the present disclosure further includes: a clustering unit, configured to process the vector of each frame of the mixed speech in each vector dimension based on a clustering algorithm to determine a centroid vector that is of the mixed speech and that corresponds to different speech of speakers in each vector dimension. The mask estimation unit 723 is specifically configured to: use a target centroid vector of the mixed speech in each vector dimension as a speech extractor of the target speaker in the corresponding vector dimension and separately measure a distance between the vector of each frame of the mixed speech in each vector dimension and the speech extractor in the corresponding vector dimension to estimate a mask of each frame of the mixed speech.

The mixed speech recognition apparatus in some embodiments of the present disclosure may further include: a comparison unit, configured to separately compare a distance between M preset speech extractors and the average vector of the enrollment speech in each vector dimension, M being greater than 1. The mask estimation unit 723 is specifically configured to: use a speech extractor with the smallest distance from the average vector of the enrollment speech in a vector dimension in the M speech extractors as a speech extractor of the target speaker in the corresponding vector dimension, and separately measure a distance between the vector of each frame of the mixed speech in each vector dimension and the speech extractor of a corresponding vector dimension to estimate a mask of each frame of the mixed speech.

It is to be understood that the mixed speech recognition apparatus in some embodiments of the present disclosure may be configured to implement all the technical solutions in the method embodiments. The functions of the functional modules may be specifically implemented according to the methods in the method embodiments. For the specific implementation process, reference may be made to the relevant descriptions in the foregoing embodiments. Details are not described herein again.

It can be learned from the above that, in some embodiments of the present disclosure, the speech features of the target speaker are acquired based on the enrollment speech in a case that the input of the enrollment speech and the mixed speech is detected; and the speech belonging to the target speaker in the mixed speech is determined based on the speech features of the target speaker. By introducing speech features of a target speaker learned by enrollment speech, in some embodiments of the present disclosure, the speech of the target speaker may be determined in the mixed speech, to facilitate tracking the speech of the target speaker in the mixed speech. For example, in the application scenario of a smart speaker, wake-up speech may be used as the enrollment speech to learn features of a speaker (that is, the target speaker) of the wake-up speech, and speech belonging to the speaker of the wake-up speech is recognized and tracked in the mixed speech that is inputted after the wake-up speech. In addition, because the speech features of the target speaker in some embodiments of the present disclosure do not depend on the number of speakers in the mixed speech, in some embodiments of the present disclosure, the number of speakers in the mixed speech does not need to be learned in advance or estimated during the mixed speech recognition process.

Figure 9:
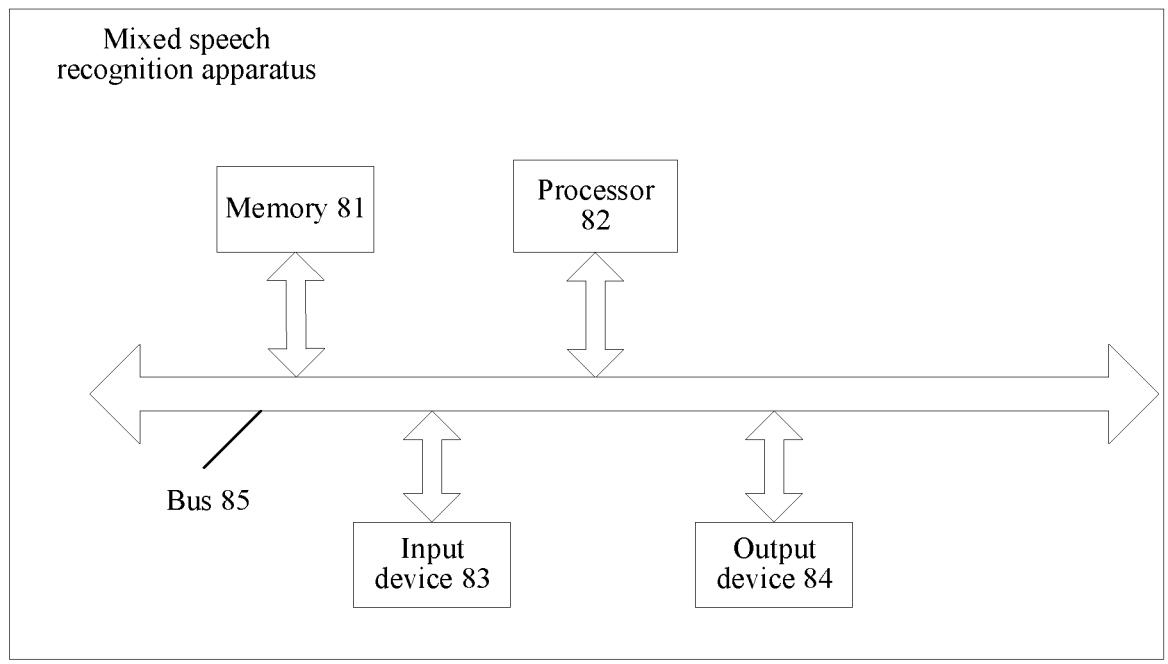
FIG. 9 is still another schematic structural diagram of a mixed speech recognition apparatus according to an embodiment of the present disclosure.

An embodiment of the present disclosure provides another mixed speech recognition apparatus. Referring to FIG. 9, the mixed speech recognition apparatus in some embodiments of the present disclosure further includes: a memory 81, one or more processors 82 (only one processor is shown in FIG. 9), and a computer program that is stored on the memory 81 and capable of being run on the processor. The memory 81 is configured to store a software program and a module. The processor 82 runs the software program and the unit stored in the memory 81, to perform various functional applications and data processing. Specifically, by running the computer program stored on the memory 81, the processor 82 implements of the following steps:

Assuming that the foregoing is the first possible implementation, in the second possible implementation provided based on the first possible implementation, the acquiring speech features of a target speaker based on the enrollment speech includes:

separately mapping a spectrum of the enrollment speech and a spectrum of the mixed speech into a K-dimensional vector space to obtain a vector of each frame of the enrollment speech in each vector dimension and a vector of each frame of the mixed speech in each vector dimension, K being not less than 1;

calculating an average vector of the enrollment speech in each vector dimension based on the vector of each frame of the enrollment speech in each vector dimension;

using the average vector of the enrollment speech in each vector dimension as a speech extractor of the target speaker in each vector dimension and separately measuring a distance between the vector of each frame of the mixed speech in each vector dimension and the speech extractor of the corresponding vector dimension to estimate a mask of each frame in the mixed speech; and determining the speech belonging to the target speaker in the mixed speech based on a mask of each frame of the mixed speech.

In the third possible implementation provided based on the second possible implementation, the calculating an average vector of the enrollment speech in each vector dimension based on the vector of each frame of the enrollment speech in each vector dimension is specifically:

calculating the average vector of the enrollment speech in each vector dimension based on the vector of an effective frame of the enrollment speech in each vector dimension, the effective frame of the enrollment speech being a frame in the enrollment speech with a spectrum amplitude greater than a spectrum amplitude comparison value, and the spectrum amplitude comparison value being equal to a difference between the largest spectrum amplitude of the enrollment speech and a preset spectrum threshold.

In the fourth possible implementation provided based on the third possible implementation, the calculating unit is specifically configured to: sum, after the vector of each frame of the enrollment speech in the corresponding vector dimension is multiplied by a supervised labeling value of the corresponding frame, vector dimensions to obtain a total vector of the effective frame of the enrollment speech in the corresponding vector dimension; and separately divide the total vector of the effective frame of the enrollment speech in each vector dimension by the sum of the supervised labeling values of the frames of the enrollment speech to obtain the average vector of the enrollment speech in each vector dimension;

the supervised labeling value of a frame in the enrollment speech being 1 when a spectrum amplitude of the frame is greater than the spectrum amplitude comparison value; and being 0 when the spectrum amplitude of the frame is not greater than the spectrum amplitude comparison value.

In the fifth possible implementation provided based on the second possible implementation or the third possible implementation or the fourth possible implementation, after the calculating an average vector of the enrollment speech in each vector dimension based on the vector of each frame of the enrollment speech in each vector dimension, by running the computer program stored on the memory 81, the processor 82 further implements the following steps:

inputting the average vector of the enrollment speech in each vector dimension and the vector of each frame of the mixed speech in each vector dimension to a pre-trained feedforward neural network to obtain a normalized vector of each frame in each vector dimension; and the using the average vector of the enrollment speech in each vector dimension as a speech extractor of the target speaker in each vector dimension and separately measuring a distance between the vector of each frame of the mixed speech in each vector dimension and the speech extractor of a corresponding vector dimension to estimate a mask of each frame of the mixed speech being replaced with:

separately measuring a distance between the normalized vector of each frame in each vector dimension and a preset speech extractor to estimate and obtain the mask of each frame of the mixed speech.

In the sixth possible implementation provided based on the second possible implementation or the third possible implementation or the fourth possible implementation, after the separately mapping a spectrum of the enrollment speech and a spectrum of the mixed speech into a K-dimensional vector space, by running the computer program stored on the memory 81, the processor 82 further implements the following steps:

processing the vector of each frame of the mixed speech in each vector dimension based on a clustering algorithm to determine a centroid vector that is of the mixed speech and that corresponds to different speech of speakers in each vector dimension; and the using the average vector of the enrollment speech in each vector dimension as a speech extractor of the target speaker in each vector dimension being replaced with: using a target centroid vector of the mixed speech in each vector dimension as a speech extractor of the target speaker in the corresponding vector dimension, the target centroid vector being a centroid vector with the smallest distance from the average vector of the enrollment speech in the same vector dimension.

In the seventh possible implementation provided based on the second possible implementation or the third possible implementation or the fourth possible implementation, after the calculating an average vector of the enrollment speech in each vector dimension based on the vector of each frame of the enrollment speech in each vector dimension, by running the computer program stored on the memory 81, the processor 82 further implements the following steps:

separately comparing a distance between M preset speech extractors and the average vector of the enrollment speech in each vector dimension, M being greater than 1; and the using the average vector of the enrollment speech in each vector dimension as a speech extractor of the target speaker in each vector dimension being replaced with: using a speech extractor with the smallest distance from the average vector of the enrollment speech in a vector dimension in the M speech extractors as a speech extractor of the target speaker in the corresponding vector dimension.

Optionally, as shown in FIG. 9, the mixed speech recognition apparatus further includes: one or more input devices 83 (only one input device is shown in FIG. 9), and one or more output devices 84 (only one output device is shown in FIG. 9). The memory 81, the processor 82, the input device 83, and the output device 84 are connected through a bus 85.

It is to be understood that in the embodiments of the present disclosure, the processor 82 may be a central processing unit (CPU). The processor may further be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general purpose processor may be a microprocessor or the processor may be any conventional processor or the like.

The input device 83 may include a keyboard, a touch pad, a fingerprint acquisition sensor (configured to acquire fingerprint information and fingerprint direction information of users), a microphone, or the like. The output device 84 may include a display, a speaker, or the like.

The memory 81 may include a read-only memory and a random access memory, and provides an instruction and data to the processor 82. A part or all of the memory 81 may further include a non-volatile random access memory.

It can be learned from the above that, in the embodiments of the present disclosure, the speech features of the target speaker are acquired based on the enrollment speech in a case that the input of the enrollment speech and the mixed speech is detected; and the speech belonging to the target speaker in the mixed speech is determined based on the speech features of the target speaker. By introducing speech features of a target speaker learned by enrollment speech, according to the embodiments of the present disclosure, the speech of the target speaker may be determined in the mixed speech, to facilitate tracking the speech of the target speaker in the mixed speech. For example, in the application scenario of a smart speaker, wake-up speech may be used as the enrollment speech to learn features of a speaker (that is, the target speaker) of the wake-up speech, and speech belonging to the speaker of the wake-up speech is recognized and tracked in the mixed speech that is inputted after the wake-up speech. In addition, because the speech features of the target speaker in the present disclosure do not depend on the number of speakers in the mixed speech, in the embodiments of the present disclosure, the number of speakers in the mixed speech does not need to be learned in advance or estimated during the mixed speech recognition process.

A person skilled in the art may clearly understand that, for the purpose of convenient and brief description, only division of the foregoing function units is used as an example for description. In the practical application, the functions may be allocated to and completed by different function modules according to requirements. That is, an internal structure of the device is divided into different functional units or modules, to complete all or some of the functions described above. Functional units and modules in the embodiments may be integrated into one processing unit, or each of the units may exist alone physically, or two or more units are integrated into one unit. The integrated unit may be implemented in the form of hardware, or may be implemented in the form of a software function unit. In addition, the specific names of each functional unit and module are only for the purpose of distinguishing each other, and are not used to limit the protection scope of the present disclosure. For specific work processes of the units and modules in the system, reference may be made to corresponding processes in the foregoing method embodiments, and details are not described herein again.

In the embodiments, descriptions of the embodiments have different emphases. As for parts that are not described in detail in one embodiment, reference can be made to the relevant descriptions of the other embodiments.

A person of ordinary skill in the art may notice that the exemplary units and algorithm steps described with reference to the embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it is not considered that the implementation goes beyond the scope of the present disclosure.

In the embodiments provided in the present disclosure, it is to be understood that the disclosed apparatus and method may be implemented in other manners. For example, the described system embodiment is merely exemplary. For example, the modules and units division are merely logical function division and there may be other division manners during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

When the integrated unit is implemented in the form of a software functional unit and sold or used as an independent product, the integrated unit may be stored in a computer-readable storage medium. Based on such understanding, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file or some intermediate forms, or the like. The computer-readable medium may include: any entity or apparatus that is capable of carrying the computer program code, a recording medium, a USB flash drive, a removable hard disk, a magnetic disk, an optical disc, a read-only memory (ROM), a random access memory (RAM), an electric carrier signal, a telecommunication signal and a software distribution medium, or the like. The content contained in the computer-readable medium may be appropriately increased or decreased according to the requirements of legislation and patent practice in jurisdictions. For example, in some jurisdictions, according to legislation and patent practice, the computer-readable medium does not include an electric carrier signal and a telecommunication signal.

The foregoing embodiments are merely intended for describing the technical solutions of the present disclosure, but not for limiting the present disclosure. Although the present disclosure is described in detail with reference to the foregoing embodiments, it is to be understood by a person of ordinary skill in the art that they may still make modifications to the technical solutions described in the foregoing embodiments or make equivalent replacements to some technical features thereof, without departing from the spirit and scope of the technical solutions of the embodiments of the present disclosure, which being included in the protection scope of the present disclosure.

What is claimed is:

1. A mixed speech recognition method, applied to a computer device, the method comprising:

monitoring speech input and detecting an enrollment speech of a target speaker and a mixed speech from the speech input, the enrollment speech comprising preset speech information, and the mixed speech being non-enrollment speech inputted after the enrollment speech;

separately mapping a spectrum of the enrollment speech and a spectrum of the mixed speech into a K-dimensional vector space by using a deep neural network of a recognition network to obtain a vector of each frame of the enrollment speech in each vector dimension and a vector of each frame of the mixed speech in each vector dimension, K being not less than 1, and the recognition network being trained by:

obtaining an estimated speech extractor of each frame of an enrollment speech training sample according to a vector of each frame of the enrollment speech training sample in each vector dimension of the K-dimensional vector space and a supervised labeling value of each frame of the enrollment speech training sample, the supervised labeling value being set by separately comparing a spectrum amplitude of each frame of the enrollment speech sample with a difference between a largest spectrum amplitude of the enrollment speech sample and a spectrum threshold;

obtaining an estimated mask of the target speaker by measuring a distance between a vector of each frame of a mixed speech training sample and the estimated speech extractor in each vector dimension of the K-dimensional vector space;

recovering a speech of the target speaker using the estimated mask and the spectrum of the mixed speech training sample; and training the recognition network by minimizing the objective function that describes a spectral error between the recovered speech of the target speaker and a reference speech of the target speaker, the spectral error being a reconstruction error of L2 based on a spectrum of the reference speech of the target speaker and a spectrum of the recovered speech;

calculating an average vector of the enrollment speech in each vector dimension based on the vector of each frame of the enrollment speech in each vector dimension;

determining a speech extractor of the target speaker in each vector dimension, and separately measuring a distance between the vector of each frame of the mixed speech in each vector dimension and the speech extractor of the corresponding vector dimension to obtain a mask of each frame in the mixed speech, wherein the speech extractor of the target speaker in each vector dimension is a centroid of the estimated speech extractor of each frame of the enrollment speech training sample of the target speaker in each vector dimension obtained during training of the recognition network, and the speech extractor of the target speaker is not re-estimated after the training of the recognition network is complete; and determining speech belonging to the target speaker in the mixed speech based on the mask of each frame of the mixed speech.

2. The mixed speech recognition method according to claim 1, wherein the calculating an average vector of the enrollment speech in each vector dimension based on the vector of each frame of the enrollment speech in each vector dimension comprises:

calculating the average vector of the enrollment speech in each vector dimension based on the vector of an effective frame of the enrollment speech in each vector dimension, the effective frame of the enrollment speech being a frame in the enrollment speech with a spectrum amplitude greater than a spectrum amplitude comparison value, and the spectrum amplitude comparison value being equal to a difference between the largest spectrum amplitude of the enrollment speech and a preset spectrum threshold.

3. The mixed speech recognition method according to claim 2, wherein the calculating the average vector of the enrollment speech in each vector dimension based on the vector of an effective frame of the enrollment speech in each vector dimension comprises:

summing, after the vector of each frame of the enrollment speech in the corresponding vector dimension is multiplied by a supervised labeling value of the corresponding frame, vector dimensions to obtain a total vector of the effective frame of the enrollment speech in the corresponding vector dimension; and separately dividing the total vector of the effective frame of the enrollment speech in each vector dimension by the sum of the supervised labeling values of the frames of the enrollment speech to obtain the average vector of the enrollment speech in each vector dimension;

the supervised labeling value of a frame in the enrollment speech being 1 when a spectrum amplitude of the frame is greater than the spectrum amplitude comparison value; and being 0 when the spectrum amplitude of the frame is not greater than the spectrum amplitude comparison value.

4. The mixed speech recognition method according to claim 1, further comprising:

after calculating the average vector of the enrollment speech in each vector dimension based on the vector of each frame of the enrollment speech in each vector dimension, inputting the average vector of the enrollment speech in each vector dimension and the vector of each frame of the mixed speech in each vector dimension to a pre-trained feedforward neural network to obtain a normalized vector of each frame in each vector dimension;

wherein the speech belonging to the target speaker in the mixed speech is determined based on the mask of each frame of the mixed speech.

5. The mixed speech recognition method according to claim 1, wherein the average vector of the enrollment speech in each vector dimension is used as the speech extractor of the target speaker in each vector dimension.

6. The mixed speech recognition method according to claim 1, wherein the mixed speech includes speeches of multiple speakers, and after the separately mapping a spectrum of the enrollment speech and a spectrum of the mixed speech into a K-dimensional vector space, the method further comprises:

processing the vector of each frame of the mixed speech in each vector dimension based on a clustering algorithm to determine, for each of the multiple speakers in the mixed speech, a centroid vector corresponding to the speaker in each vector dimension; and using a target centroid vector of the mixed speech in each vector dimension as the speech extractor of the target speaker in the corresponding vector dimension, the target centroid vector being a centroid vector with the smallest distance from the average vector of the enrollment speech in the same vector dimension.

7. The mixed speech recognition method according to claim 1, wherein after the calculating an average vector of the enrollment speech in each vector dimension based on the vector of each frame of the enrollment speech in each vector dimension, the method further comprises:

separately comparing a distance between M preset speech extractors and the average vector of the enrollment speech in each vector dimension, M being greater than 1; and using a speech extractor with the smallest distance from the average vector of the enrollment speech in a vector dimension in the M preset speech extractors as the speech extractor of the target speaker in the corresponding vector dimension.

8. The mixed speech recognition method according to claim 1, wherein the deep neural network is composed of four layers of bidirectional long short-term memory networks, each layer of the bidirectional long short-term memory network has 600 nodes; and a value of K is 40.

9. The method according to claim 1, wherein obtaining an estimated mask of the target speaker by measuring a distance between a vector of each frame of a mixed speech training sample and the estimated speech extractor in each vector dimension of the K-dimensional vector space comprises:

determining a summation of inner products between the vector of a frame of the mixed speech training sample and the estimated speech extractor in each vector dimension;

determining a sigmoid function of the summation as the estimated mask of the frame of the mixed speech sample.

10. A mixed speech recognition apparatus, comprising:
a memory; and
a processor coupled to the memory and configured to perform:

monitoring speech input and detecting an enrollment speech of a target speaker and a mixed speech from the speech input, the enrollment speech comprising preset speech information, and the mixed speech being non-enrollment speech inputted after the enrollment speech;

separately mapping a spectrum of the enrollment speech and a spectrum of the mixed speech into a K-dimensional vector space by using a deep neural network of a recognition network to obtain a vector of each frame of the enrollment speech in each vector dimension and a vector of each frame of the mixed speech in each vector dimension, K being not less than 1, and the recognition network being trained by:

obtaining an estimated speech extractor of each frame of an enrollment speech training sample according to a vector of each frame of the enrollment speech training sample in each vector dimension of the K-dimensional vector space and a supervised labeling value of each frame of the enrollment speech training sample, the supervised labeling value being set by separately comparing a spectrum amplitude of each frame of the enrollment speech sample with a difference between a largest spectrum amplitude of the enrollment speech sample and a spectrum threshold;

obtaining an estimated mask of the target speaker by measuring a distance between a vector of each frame of a mixed speech training sample and the estimated speech extractor in each vector dimension of the K-dimensional vector space;

recovering a speech of the target speaker using the estimated mask and the spectrum of the mixed speech training sample; and training the recognition network by minimizing the objective function that describes a spectral error between the recovered speech of the target speaker and a reference speech of the target speaker, the spectral error being a reconstruction error of L2 based on a spectrum of the reference speech of the target speaker and a spectrum of the recovered speech;

calculating an average vector of the enrollment speech in each vector dimension based on the vector of each frame of the enrollment speech in each vector dimension;

determining a speech extractor of the target speaker in each vector dimension, and separately measuring a distance between the vector of each frame of the mixed speech in each vector dimension and the speech extractor of the corresponding vector dimension to obtain a mask of each frame in the mixed speech, wherein the speech extractor of the target speaker in each vector dimension is a centroid of the estimated speech extractor of each frame of the enrollment speech training sample of the target speaker in each vector dimension obtained during training of the recognition network, and the speech extractor of the target speaker is not re-estimated after the training of the recognition network is complete; and determining speech belonging to the target speaker in the mixed speech based on the mask of each frame of the mixed speech.

11. The mixed speech recognition apparatus according to claim 10, wherein the calculating an average vector of the enrollment speech in each vector dimension based on the vector of each frame of the enrollment speech in each vector dimension comprises:

calculating the average vector of the enrollment speech in each vector dimension based on the vector of an effective frame of the enrollment speech in each vector dimension, the effective frame of the enrollment speech being a frame in the enrollment speech with a spectrum amplitude greater than a spectrum amplitude comparison value, and the spectrum amplitude comparison value being equal to a difference between the largest spectrum amplitude of the enrollment speech and a preset spectrum threshold.

12. The mixed speech recognition apparatus according to claim 11, wherein the calculating the average vector of the enrollment speech in each vector dimension based on the vector of an effective frame of the enrollment speech in each vector dimension comprises:

summing, after the vector of each frame of the enrollment speech in the corresponding vector dimension is multiplied by a supervised labeling value of the corresponding frame, vector dimensions to obtain a total vector of the effective frame of the enrollment speech in the corresponding vector dimension; and separately dividing the total vector of the effective frame of the enrollment speech in each vector dimension by the sum of the supervised labeling values of the frames of the enrollment speech to obtain the average vector of the enrollment speech in each vector dimension;

the supervised labeling value of a frame in the enrollment speech being 1 when a spectrum amplitude of the frame is greater than the spectrum amplitude comparison value; and being 0 when the spectrum amplitude of the frame is not greater than the spectrum amplitude comparison value.

13. The mixed speech recognition apparatus according to claim 10, wherein the processor is further configured to perform:

after calculating the average vector of the enrollment speech in each vector dimension based on the vector of each frame of the enrollment speech in each vector dimension, inputting the average vector of the enrollment speech in each vector dimension and the vector of each frame of the mixed speech in each vector dimension to a pre-trained feedforward neural network to obtain a normalized vector of each frame in each vector dimension;

wherein the speech belonging to the target speaker in the mixed speech is determined based on the mask of each frame of the mixed speech.

14. The mixed speech recognition apparatus according to claim 10, wherein the average vector of the enrollment speech in each vector dimension is used as the speech extractor of the target speaker in each vector dimension.

15. The mixed speech recognition apparatus according to claim 10, wherein the mixed speech includes speeches of multiple speakers, and the processor is further configured to perform:

processing the vector of each frame of the mixed speech in each vector dimension based on a clustering algorithm to determine, for each of the multiple speakers in the mixed speech, a centroid vector corresponding to the speaker in each vector dimension; and using a target centroid vector of the mixed speech in each vector dimension as the speech extractor of the target speaker in the corresponding vector dimension, the target centroid vector being a centroid vector with the smallest distance from the average vector of the enrollment speech in the same vector dimension.

16. The mixed speech recognition apparatus according to claim 10, wherein the processor is further configured to perform:

separately comparing a distance between M preset speech extractors and the average vector of the enrollment speech in each vector dimension, M being greater than 1; and using a speech extractor with the smallest distance from the average vector of the enrollment speech in a vector dimension in the M preset speech extractors as the speech extractor of the target speaker in the corresponding vector dimension.

17. A non-transitory computer-readable storage medium, storing a computer program, the computer program, when executed by a processor, implementing:

monitoring speech input and detecting an enrollment speech of a target speaker and a mixed speech from the speech input, the enrollment speech comprising preset speech information, and the mixed speech being non-enrollment speech inputted after the enrollment speech;

separately mapping a spectrum of the enrollment speech and a spectrum of the mixed speech into a K-dimensional vector space by using a deep neural network of a recognition network to obtain a vector of each frame of the enrollment speech in each vector dimension and a vector of each frame of the mixed speech in each vector dimension, K being not less than 1, and the recognition network being trained by:

obtaining an estimated speech extractor of each frame of an enrollment speech training sample according to a vector of each frame of the enrollment speech training sample in each vector dimension of the K-dimensional vector space and a supervised labeling value of each frame of the enrollment speech training sample, the supervised labeling value being set by separately comparing a spectrum amplitude of each frame of the enrollment speech sample with a difference between a largest spectrum amplitude of the enrollment speech sample and a spectrum threshold;

obtaining an estimated mask of the target speaker by measuring a distance between a vector of each frame of a mixed speech training sample and the estimated speech extractor in each vector dimension of the K-dimensional vector space;

recovering a speech of the target speaker using the estimated mask and the spectrum of the mixed speech training sample; and training the recognition network by minimizing the objective function that describes a spectral error between the recovered speech of the target speaker and a reference speech of the target speaker, the spectral error being a reconstruction error of L2 based on a spectrum of the reference speech of the target speaker and a spectrum of the recovered speech;

calculating an average vector of the enrollment speech in each vector dimension based on the vector of each frame of the enrollment speech in each vector dimension;

determining a speech extractor of the target speaker in each vector dimension, and separately measuring a distance between the vector of each frame of the mixed speech in each vector dimension and the speech extractor of the corresponding vector dimension to obtain a mask of each frame in the mixed speech, wherein the speech extractor of the target speaker in each vector dimension is a centroid of the estimated speech extractor of each frame of the enrollment speech training sample of the target speaker in each vector dimension obtained during training of the recognition network, and the speech extractor of the target speaker is not re-estimated after the training of the recognition network is complete; and determining speech belonging to the target speaker in the mixed speech based on the mask of each frame of the mixed speech.

* * * * *